United States Patent
Liu et al.

(10) Patent No.: US 12,118,496 B1
(45) Date of Patent: Oct. 15, 2024

(54) MERCHANT INCREMENTAL ELECTRONIC IMPACT VALUE PREDICTION AND RANKING USING MULTIPLE MACHINE LEARNING MODELS

(71) Applicant: Groupon, Inc., Chicago, IL (US)

(72) Inventors: Situo Liu, Chicago, IL (US); Al Afsin Bulbul, Chicago, IL (US); Andrew Jonathan Lisy, Chicago, IL (US); Ana Ananthakumar, Chicago, IL (US); Hechao Sun, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 220 days.

(21) Appl. No.: 17/014,766

(22) Filed: Sep. 8, 2020

Related U.S. Application Data

(60) Provisional application No. 62/897,171, filed on Sep. 6, 2019.

(51) Int. Cl.
*G06Q 10/00* (2012.01)
*G06N 20/20* (2019.01)
(Continued)

(52) U.S. Cl.
CPC ....... *G06Q 10/06375* (2013.01); *G06N 20/20* (2019.01); *G06Q 10/06398* (2013.01);
(Continued)

(58) Field of Classification Search
None
See application file for complete search history.

(56) References Cited

U.S. PATENT DOCUMENTS

2008/0262893 A1\* 10/2008 Hoffberg ............... G06Q 40/00
709/241
2019/0164152 A1\* 5/2019 Bucher ............... H04L 9/3239
(Continued)

OTHER PUBLICATIONS

Bui, Lam Thu, A novel evolutionary multi-objective ensemble learning approach for forecasting currency exchange rates, 2018, Data & Knowledge Engineering, 114 (2018) 40-66, https://www.sciencedirect.com/science/article/pii/S0169023X1730054X, p. 1-27.\*

*Primary Examiner* — Joseph M Waesco
(74) *Attorney, Agent, or Firm* — Alston & Bird LLP

(57) ABSTRACT

Methods, apparatus, systems, and computer program products are disclosed for utilizing specially configured machine learning models to generate incremental currency value(s) associated with one or more target merchant data objects. Some embodiments, based on one or more market record sets, identify an actual electronic currency value for a total merchant data object set, and include a counterfactual model configured to generate a counterfactual electronic currency value for use in determining a counterfactual incremental electronic currency impact, and in some embodiments for ranking other models. Embodiments, additionally or alternatively, include an incrementality-trained ensemble model for generating a predictive incremental electronic currency impact. The incrementality-trained ensemble model may be trained to predict based on the rankings of the outputs of the counterfactual model. Embodiments may further rank target merchant data objects and perform one or more additional actions, including assigning the target merchant data objects to sales account data structures for management.

20 Claims, 7 Drawing Sheets

(51) Int. Cl.
  *G06Q 10/0637*  (2023.01)
  *G06Q 10/0639*  (2023.01)
  *G06Q 10/105*  (2023.01)
  *G06Q 20/06*  (2012.01)
  *G06Q 30/0201*  (2023.01)

(52) U.S. Cl.
  CPC ....... *G06Q 10/105* (2013.01); *G06Q 20/0652* (2013.01); *G06Q 30/0206* (2013.01)

(56) References Cited

U.S. PATENT DOCUMENTS

| | | | |
|---|---|---|---|
| 2019/0236594 A1* | 8/2019 | Ehrlich-Quinn | G06Q 20/401 |
| 2019/0312734 A1* | 10/2019 | Wentz | H04L 9/0877 |
| 2020/0007331 A1* | 1/2020 | Wentz | G06F 1/14 |
| 2020/0052898 A1* | 2/2020 | Wentz | H04L 9/50 |
| 2020/0082365 A1* | 3/2020 | Brock | G06Q 20/065 |
| 2020/0320631 A1* | 10/2020 | Gordon, III | H04L 9/50 |
| 2020/0342448 A1* | 10/2020 | Nakamura | G06Q 20/3672 |
| 2021/0279763 A1* | 9/2021 | Reynolds | G06Q 30/0229 |
| 2021/0383260 A1* | 12/2021 | Zhang | G06Q 20/322 |

\* cited by examiner

MERCHANT INCREMENTAL ELECTRONIC IMPACT VALUE PREDICTION AND RANKING USING MULTIPLE MACHINE LEARNING MODELS

CROSS-REFERENCE TO RELATED APPLICATIONS

The present application claims priority and benefit of U.S. Provisional Application No. 62/897,171, titled "MERCHANT INCREMENTAL ELECTRONIC IMPACT VALUE PREDICTION AND RANKING USING MULTIPLE MACHINE LEARNING MODELS," filed Sep. 6, 2019, the contents of which are incorporated by reference herein in their entirety.

TECHNOLOGICAL FIELD

Embodiments of the disclosure relate, generally, to specially programmed machine learning models for generating a predictive incremental electronic currency impact for use in allocating resources to an associated target merchant data object. Specifically, embodiments relate to generating predictive incremental electronic currency impacts for ranking one or more target merchant data objects associated with a merchant market identifier using a combination of specially configured machine learning models, including a counterfactual model, a predictive model, and an incrementality-trained ensemble model.

BACKGROUND

Current methods, systems, apparatuses, and computer program products determining value contributed by a given merchant data object for resource allocation exhibit a plurality of problems that make current systems inefficient, insufficient, or non-ideal for practical use. Through applied effort, ingenuity, and innovation, solutions to improve such methods, systems, apparatuses, and computer program products have been realized and are described in connection with embodiments of the present disclosure.

BRIEF SUMMARY

Efficient use of resources, including business resources (e.g., manpower, monetary resources, physical materials, and/or the like) and computing resources (e.g., processing resources, networking resources, memory storage space, and the like), utilized by electronic promotion and marketing systems is important for enabling such systems to function in a manner that remains efficient as well as accurate and with reduced or otherwise minimized cost. For example, in some embodiments, enhanced promotion and marketing systems generate and utilize incremental electronic currency impact as an accurate measure, based on associated electronic data, of an amount of resources to allocate to a particular target merchant data object. Generating an accurate predictive incremental electronic currency impact for a target merchant data object enables appropriate resource allocation towards the target merchant data object. For example, if significant computing resources are assigned to merchant data objects associated with a low predictive incremental electronic currency impact, such computing resources may be wasted. A merchant data object may also be assigned or otherwise associated with a sales user account data structure, where each sales user account data structure may be associated with a limited amount of computing resources. Thus, if merchant account data objects are poorly assigned based on inaccurate predictive incremental electronic currency impacts, such poor assignment leads to a sub-optimal utilization of resources, for example computing resources, where computing resources remain unused or wasted on managing account data objects with low incrementality.

Generating a predictive incremental electronic currency impact enables determining an increase (or decrease) caused by the target merchant data object on a total electronic currency value with respect to all merchant data objects associated with a particular merchant market identifier, as compared to the total electronic currency value associated with the merchant market identifier in an alternative state (e.g., associating the target merchant data object with a merchant market identifier that the target merchant data object is currently associated with, or removing association of the target merchant data object from a merchant market identifier where the target merchant data object is currently associated). Accordingly, based on predictive incremental electronic currency impact for various merchant data objects, appropriate computing resources may be allocated to the various merchant data objects so as to minimize waste. Such predictive incremental electronic currency impact must be accurate to avoid wasted resources in unnecessarily assigning and/or re-assigning merchant data objects that do not significantly increase electronic currency value.

Determining one or more incremental electronic currency values (e.g., a predictive incremental electronic currency impact and a counterfactual incremental electronic currency impact for one or more merchant data objects) enables ranking of various merchant data objects, determining accuracy of predictive models, utilization of the one or more incremental electronic currency impacts in generating one or more merchant offer data object, and/or storing and/or assigning a target merchant data object to a sales user account data structure. Computing resources allocated to sales user account data structures may be utilized to manage the target merchant data object, for example to generate one or more merchant offer data objects, to transmit generated merchant offers to the target merchant data object, and/or to manage deal objects associated with the target merchant data object.

Embodiments of the present disclosure utilize machine learning to improve the overall computing efficiency with respect to each of these actions. The specific predictive model and counterfactual models utilize machine learning to remove human subjectivity in evaluating target merchant data objects and/or evaluating predictive models. Thus, embodiments of the present disclosure utilize specific computer-implemented processes to remove human subjectivity from generating a predictive incremental electronic currency impact, ranking various merchant data objects, and/or assigning merchant data objects to sales user account data structure(s). Additionally or alternatively, the specific combination of predictive model(s) together with counterfactual model(s) provides improvements in the accuracy of predicted values while retaining and/or improving overall system efficiency with respect to various resources, including computing resources.

In accordance with one aspect of the present disclosure, an apparatus for merchant incremental electronic currency impact value prediction and ranking is provided. In at least one example embodiment, the apparatus includes at least one processor and at least one memory. The at least one memory includes computer-coded instructions stored thereon. The computer-coded instructions, in execution with the at least one processor, are configured to cause the apparatus to receive a merchant market identifier associated with a total merchant data object set; receive a target merchant identifier associated with a target merchant data object, where the total merchant data object set is associated with the target merchant data object and a remaining merchant data object set; determine a counterfactual input feature set associated with the remaining merchant data object set; generate, based on the counterfactual input feature set and using a counterfactual model, a counterfactual electronic currency value associated with the remaining merchant data object set; identify an actual electronic currency value associated with the total merchant data object set; and determine a counterfactual incremental electronic currency impact associated with the target merchant data object based on the actual electronic currency value and the counterfactual electronic currency value. In some such embodiments of the apparatus, the counterfactual model comprises a linear mixture model.

In some example embodiments of the apparatus, the counterfactual incremental electronic currency impact is associated with a first timestamp interval, and the apparatus is further configured to calculate an adjusted counterfactual incremental electronic currency impact based on the counterfactual electronic currency value, wherein the adjusted counterfactual incremental electronic currency impact is associated with a second timestamp interval.

In some example embodiments of the apparatus, to determine the counterfactual input feature set, the apparatus is configured to identify a first observed market record set associated with the merchant market identifier; and identify a second observed market record set associated with the target merchant data object, where the counterfactual input feature set is determined based on the first observed market record set and the second observed market record set.

In some example embodiments of the apparatus, the apparatus is further configured to identify a counterfactual training market record set, the counterfactual training market record set associated with a counterfactual training feature set and a first electronic currency value set; and train the counterfactual model based on the counterfactual training market record set.

In some example embodiments of the apparatus, the apparatus is configured to receive a predictive input set comprising at least the merchant market identifier; generate, using a predictive model, a predictive electronic currency value associated with the merchant market identifier; identify a dependent score set associated with the merchant market identifier; and generate, using an incrementality-trained ensemble model, a predictive incremental electronic currency impact associated with the target merchant identifier based on the predictive electronic currency value and the dependent score set.

In some example embodiments of the apparatus, the apparatus is configured to identify a predictive training market record set, the predictive training market record set associated with at least a predictive training feature set and a second electronic currency value set, wherein the electronic currency value set comprises at least the adjusted counterfactual incremental electronic currency impact.

In some example embodiments of the apparatus, the apparatus is further configured to identify a record time horizon threshold; and for at least one primary merchant market identifier: query for a primary market record set based on the primary merchant market identifier; determine whether the primary market record set satisfies the record time horizon threshold, where, in a circumstance where the primary market record set satisfies the record time horizon threshold, the counterfactual market record set or the predictive market record set comprises at least the primary market record set associated with the primary merchant market identifier, and where, in a circumstance where the primary market record set does not satisfy the record time horizon threshold, the computer program instructions are further configured to: identify a shared merchant market identifier associated with the primary merchant market identifier; and retrieve a shared market record set associated with the shared merchant market identifier, where the counterfactual market record set or the predictive market record set comprise at least the shared market record set associated with the shared merchant market identifier.

In some example embodiments of the apparatus, the apparatus is further configured to identify an ensemble training record set, the ensemble training record set associated with an ensemble training feature set; and train the incrementality-trained ensemble model based on the ensemble training record set.

In some example embodiments of the apparatus, the predictive incremental electronic currency impact comprises a first predictive incremental electronic currency impact, and the apparatus is further configured to generate a second predictive incremental electronic currency impact associated with a second target merchant identifier and the merchant market identifier; generate a target merchant data object ranking list based on the first predictive incremental electronic currency impact and the second predictive incremental electronic currency impact, where the target merchant data object ranking list comprises at least a top ranked target merchant identifier; identify a sales user account identifier associated with a sales user account data structure; and store the top ranked target merchant identifier associated with the identified sales user account identifier.

In some example embodiments of the apparatus, the predictive incremental electronic currency impact comprises a first predictive incremental electronic currency impact, wherein a first model comprises a combination of the predictive model and the incrementality-trained ensemble model, and the apparatus is further configured to generate a first value rank correlation score based on at least the counterfactual incremental electronic currency impact and predictive incremental electronic currency impact, the first value rank correlation score associated with the first model; identify at least one additional value rank correlation score associated with at least one other model; generate a model ranking list based on the first value rank correlation score and the at least one additional value rank correlation score, where the model ranking list comprises a top ranked model; and configure at least one device based on the top ranked model.

In accordance with another aspect of the present disclosure, a computer-implemented method for merchant incremental electronic currency impact value prediction and ranking is provided. The computer-implemented method includes one or more steps, which may be implemented and/or performed using various computing hardware and/or software implementations described herein. In some example embodiments, the computer-implemented method includes receiving a merchant market identifier associated with a total merchant data object set; receiving a target merchant identifier associated with a target merchant data object, where the total merchant data object set is associated with the target merchant data object and a remaining merchant data object set; determining a counterfactual input feature set associated with the remaining merchant data object set; generating, based on the counterfactual input feature set and using a counterfactual model, a counterfactual electronic currency value associated with the remaining merchant data object set; identifying an actual electronic currency value associated with the total merchant data object set; and determining a counterfactual incremental electronic currency impact associated with the target merchant data object based on the actual electronic currency value and the counterfactual electronic currency value. In some example embodiments of the computer-implemented method, the counterfactual model comprises a linear mixture model.

In some example embodiments of the computer-implemented method, the counterfactual incremental electronic currency impact is associated with a first timestamp interval, and the method further includes calculating an adjusted counterfactual incremental electronic currency impact based on the counterfactual electronic currency value, wherein the adjusted counterfactual incremental electronic currency impact is associated with a second timestamp interval.

In some example embodiments of the computer-implemented method, determining the counterfactual input feature set comprises identifying a first observed market record set associated with the merchant market identifier; and identifying a second observed market record set associated with the target merchant data object, where the counterfactual input feature set is determined based on the first observed market record set and the second observed market record set.

In some example embodiments of the computer-implemented method, identifying a counterfactual training market record set, the counterfactual training market record set associated with a counterfactual training feature set and a first electronic currency value set; and training the counterfactual model based on the counterfactual training market record set.

In some example embodiments of the computer-implemented method, the method further comprises receiving a predictive input set comprising at least the merchant market identifier; generating, using a predictive model, a predictive electronic currency value associated with the merchant market identifier; identifying a dependent score set associated with the merchant market identifier; and generating, using an incrementality-trained ensemble model, a predictive incremental electronic currency impact associated with the target merchant identifier based on the predictive electronic currency value and the dependent score set.

In some such example embodiments of the computer-implemented method, the method further comprises identifying a predictive training market record set, the predictive training market record set associated with at least a predictive training feature set and a second electronic currency value set, where the electronic currency value set comprises at least the adjusted counterfactual incremental electronic currency impact.

In some example embodiments of the computer-implemented method, identifying a record time horizon threshold; and for at least one primary merchant market identifier: querying for a primary market record set based on the primary merchant market identifier; determining whether the primary market record set satisfies the record time horizon threshold, where, in a circumstance where the primary market record set satisfies the record time horizon threshold, the counterfactual market record set or the predictive market record set comprises at least the primary market record set associated with the primary merchant market identifier, and where, in a circumstance where the primary market record set does not satisfy the record time horizon threshold: identifying a shared merchant market identifier associated with the primary merchant market identifier; and retrieving a shared market record set associated with the shared merchant market identifier, where the counterfactual market record set or the predictive market record set comprise at least the shared market record set associated with the shared merchant market identifier.

In some example embodiments of the computer-implemented method, identifying an ensemble training record set, the ensemble training record set associated with an ensemble training feature set; and training the incrementality-trained ensemble model based on the ensemble training record set.

In some example embodiments of the computer-implemented method, the predictive incremental electronic currency impact comprises a first predictive incremental electronic currency impact, and the method further comprises generating a second predictive incremental electronic currency impact associated with a second target merchant identifier and the merchant market identifier; generating a target merchant data object ranking list based on the first predictive incremental electronic currency impact and the second predictive incremental electronic currency impact, where the target merchant data object ranking list comprises at least a top ranked target merchant identifier; identifying a sales user account identifier associated with a sales user account data structure; and storing the top ranked target merchant identifier associated with the identified sales user account identifier.

In some example embodiments of the computer-implemented method, the predictive incremental electronic currency impact comprises a first predictive incremental electronic currency impact, where a first model comprises a combination of the predictive model and the incrementality-trained ensemble model, and the method further comprises generating a first value rank correlation score based on at least the counterfactual incremental electronic currency impact and predictive incremental electronic currency impact, the first value rank correlation score associated with the first model; identifying at least one additional value rank correlation score associated with at least one other model; generating a model ranking list based on the first value rank correlation score and the at least one additional value rank correlation score, where the model ranking list comprises a top ranked model; and configuring at least one device based on the top ranked model.

In accordance with another aspect of the present disclosure, a computer program product for merchant incremental electronic currency impact value prediction and ranking is provided. The computer program product comprises at least one non-transitory computer-readable storage medium. The at least one non-transitory computer-readable storage medium has computer program instructions thereon. The computer program instructions, when executed by a processor, are configured to receive a merchant market identifier associated with a total merchant data object set; receive a target merchant identifier associated with a target merchant data object, where the total merchant data object set is associated with the target merchant data object and a remaining merchant data object set; determine a counterfactual input feature set associated with the remaining merchant data object set; generate, based on the counterfactual input feature set and using a counterfactual model, a counterfactual electronic currency value associated with the remaining merchant data object set; identify an actual electronic currency value associated with the total merchant data object set; and determine a counterfactual incremental electronic currency impact associated with the target merchant data object based on the actual electronic currency value and the counterfactual electronic currency value. In some example embodiments of the computer program product, the counterfactual model comprises a linear mixture model.

In some example embodiments of the computer program product, the counterfactual incremental electronic currency impact is associated with a first timestamp interval, and the program code instructions are further configured to calculate an adjusted counterfactual incremental electronic currency impact based on the counterfactual electronic currency value, wherein the adjusted counterfactual incremental electronic currency impact is associated with a second timestamp interval.

In some example embodiments of the computer program product, to determine the counterfactual input feature set, the program code instructions are configured to identify a first observed market record set associated with the merchant market identifier; and identify a second observed market record set associated with the target merchant data object, where the counterfactual input feature set is determined based on the first observed market record set and the second observed market record set.

In some example embodiments of the computer program product, the program code instructions are further configured to identify a counterfactual training market record set, the counterfactual training market record set associated with a counterfactual training feature set and a first electronic currency value set; and train the counterfactual model based on the counterfactual training market record set.

In some example embodiments of the computer program product, the computer program instructions are further configured to receive a predictive input set comprising at least the merchant market identifier; generate, using a predictive model, a predictive electronic currency value associated with the merchant market identifier; identify a dependent score set associated with the merchant market identifier; and generate, using an incrementality-trained ensemble model, a predictive incremental electronic currency impact associated with the target merchant identifier based on the predictive electronic currency value and the dependent score set.

In some example embodiments of the computer program product, the program code instructions are further configured to identify a predictive training market record set, the predictive training market record set associated with at least a predictive training feature set and a second electronic currency value set, wherein the electronic currency value set comprises at least the adjusted counterfactual incremental electronic currency impact.

In some example embodiments of the computer program product, the program code instructions are further configured to identify a record time horizon threshold; and for at least one primary merchant market identifier: query for a primary market record set based on the primary merchant market identifier; determine whether the primary market record set satisfies the record time horizon threshold, where, in a circumstance where the primary market record set satisfies the record time horizon threshold, the counterfactual market record set or the predictive market record set comprises at least the primary market record set associated with the primary merchant market identifier, and where, in a circumstance where the primary market record set does not satisfy the record time horizon threshold, the computer program instructions are further configured to: identify a shared merchant market identifier associated with the primary merchant market identifier; and retrieve a shared market record set associated with the shared merchant market identifier, where the counterfactual market record set or the predictive market record set comprise at least the shared market record set associated with the shared merchant market identifier.

In some example embodiments of the computer program product, the program code instructions are further configured to identify an ensemble training record set, the ensemble training record set associated with an ensemble training feature set; and train the incrementality-trained ensemble model based on the ensemble training record set.

In some example embodiments of the computer program product, the predictive incremental electronic currency impact comprises a first predictive incremental electronic currency impact, and the program code instructions are further configured to generate a second predictive incremental electronic currency impact associated with a second target merchant identifier and the merchant market identifier; generate a target merchant data object ranking list based on the first predictive incremental electronic currency impact and the second predictive incremental electronic currency impact, where the target merchant data object ranking list comprises at least a top ranked target merchant identifier; identify a sales user account identifier associated with a sales user account data structure; and store the top ranked target merchant identifier associated with the identified sales user account identifier.

In some example embodiments of the computer program product, the predictive incremental electronic currency impact comprises a first predictive incremental electronic currency impact, where a first model comprises a combination of the predictive model and the incrementality-trained ensemble model, and the computer program instructions are further configured to generate a first value rank correlation score based on at least the counterfactual incremental electronic currency impact and predictive incremental electronic currency impact, the first value rank correlation score associated with the first model; identify at least one additional value rank correlation score associated with at least one other model; generate a model ranking list based on the first value rank correlation score and the at least one additional value rank correlation score, where the model ranking list comprises a top ranked model; and configure at least one device based on the top ranked model.

In accordance with another aspect of the present disclosure, another apparatus for merchant incremental electronic currency impact value prediction and ranking is provided. In at least one example embodiment, the apparatus includes at least one processor and at least one memory. The at least one memory includes computer-coded instructions stored thereon. The computer-coded instructions are configured to, in execution with the at least one processor, configure the apparatus to receive a merchant market identifier; receive a target merchant identifier associated with a target merchant data object; receive a predictive input set comprising at least the merchant market identifier; generate, using a predictive model, a predictive electronic currency value associated with the merchant market identifier; identify a dependent score set associated with the merchant market identifier; and generate, using an incrementality-trained ensemble model, a predictive incremental electronic currency impact associated with the target merchant identifier based on the predictive electronic currency value and the dependent score set. Additionally, in some embodiments of the apparatus, the apparatus is further configured to receive a second target merchant identifier associated with a second target merchant data object; receive a second predictive input set comprising at least the second merchant market identifier; generate, using the predictive model, a second predictive electronic currency value associated with the second merchant market identifier; identify a second dependent score set associated with the second merchant market identifier; and generate, using the incrementality-trained ensemble model, a second predictive incremental electronic currency impact associated with the second target merchant identifier based on the second predictive electronic currency value and the second dependent score set.

In accordance with another aspect of the present disclosure, another computer-implemented method for merchant incremental electronic currency impact value prediction and ranking is provided. In at least one example embodiment, the computer-implemented method includes receiving a merchant market identifier; receiving a target merchant identifier associated with a target merchant data object; receiving a predictive input set comprising at least the merchant market identifier; generating, using a predictive model, a predictive electronic currency value associated with the merchant market identifier; identifying a dependent score set associated with the merchant market identifier; and generating, using an incrementality-trained ensemble model, a predictive incremental electronic currency impact associated with the target merchant identifier based on the predictive electronic currency value and the dependent score set. Additionally, in some embodiments of the computer-implemented method, the method further includes receiving a second target merchant identifier associated with a second target merchant data object; receiving a second predictive input set comprising at least the second merchant market identifier; generating, using the predictive model, a second predictive electronic currency value associated with the second merchant market identifier; identifying a second dependent score set associated with the second merchant market identifier; and generating, using the incrementality-trained ensemble model, a second predictive incremental electronic currency impact associated with the second target merchant identifier based on the second predictive electronic currency value and the second dependent score set.

In accordance with another aspect of the present disclosure, another computer program product for merchant incremental electronic currency impact value prediction and ranking is provided. The computer program product comprises at least one non-transitory computer-readable storage medium. The at least one non-transitory computer-readable storage medium has computer program instructions thereon. The computer program instructions, when executed by a processor, are configured to receive a merchant market identifier; receive a target merchant identifier associated with a target merchant data object; receive a predictive input set comprising at least the merchant market identifier; generate, using a predictive model, a predictive electronic currency value associated with the merchant market identifier; identify a dependent score set associated with the merchant market identifier; and generate, using an incrementality-trained ensemble model, a predictive incremental electronic currency impact associated with the target merchant identifier based on the predictive electronic currency value and the dependent score set. Additionally, in some embodiments of the computer program product, computer program instructions are further configured to receive a second target merchant identifier associated with a second target merchant data object; receive a second predictive input set comprising at least the second merchant market identifier; generate, using the predictive model, a second predictive electronic currency value associated with the second merchant market identifier; identify a second dependent score set associated with the second merchant market identifier; and generate, using the incrementality-trained ensemble model, a second predictive incremental electronic currency impact associated with the second target merchant identifier based on the second predictive electronic currency value and the second dependent score set.

It should be appreciated that, in other embodiments, an apparatus includes means for performing one or more of the computer-implemented method(s) described above. Similarly, it should be appreciated that, in other embodiments, a computer program product includes means for performing one or more of the computer-implemented method(s) described above. Similarly, it should also be appreciated that, in other embodiments, a computer-implemented method utilizes various means described herein for implementing each step of the computer-implemented method.

BRIEF DESCRIPTION OF THE DRAWINGS

Figure 1:
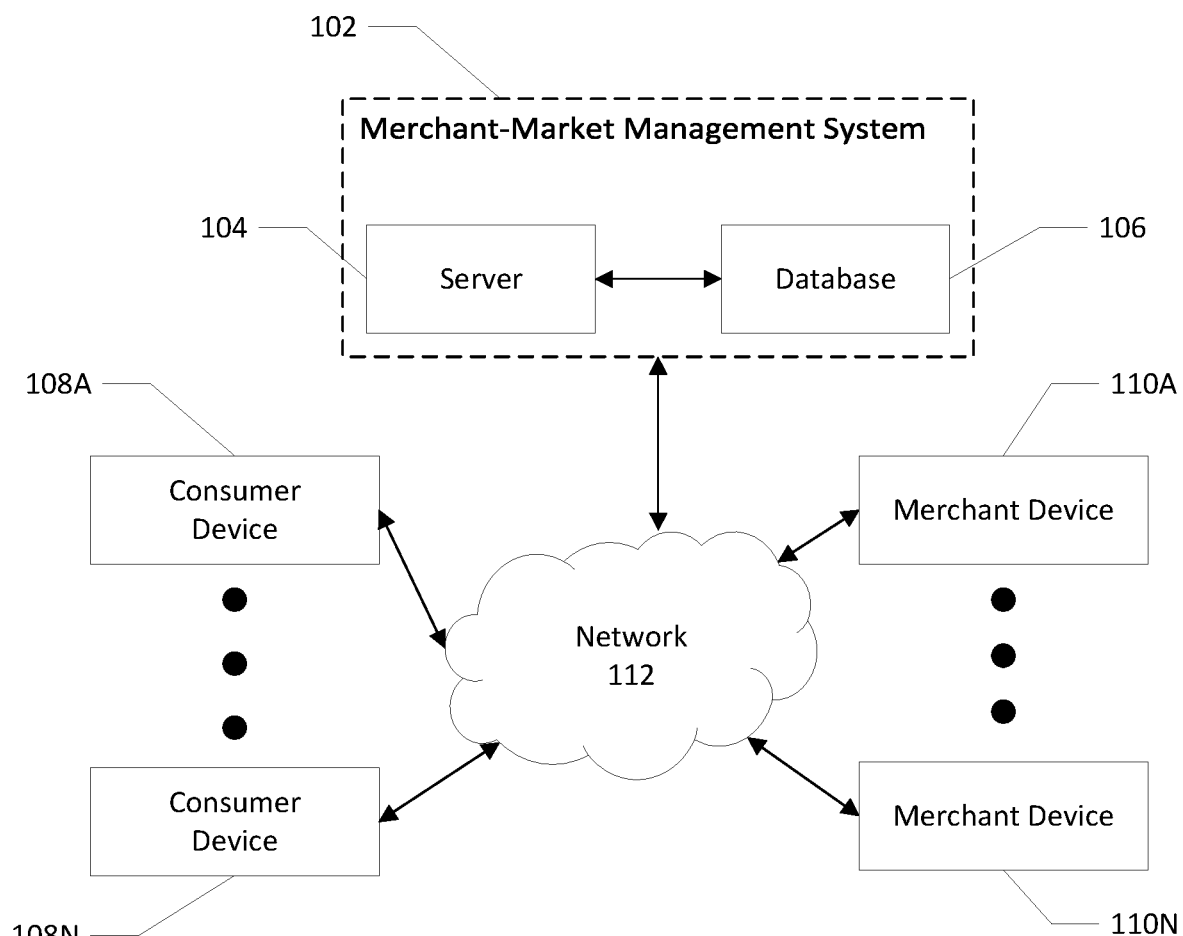
Figure 2:
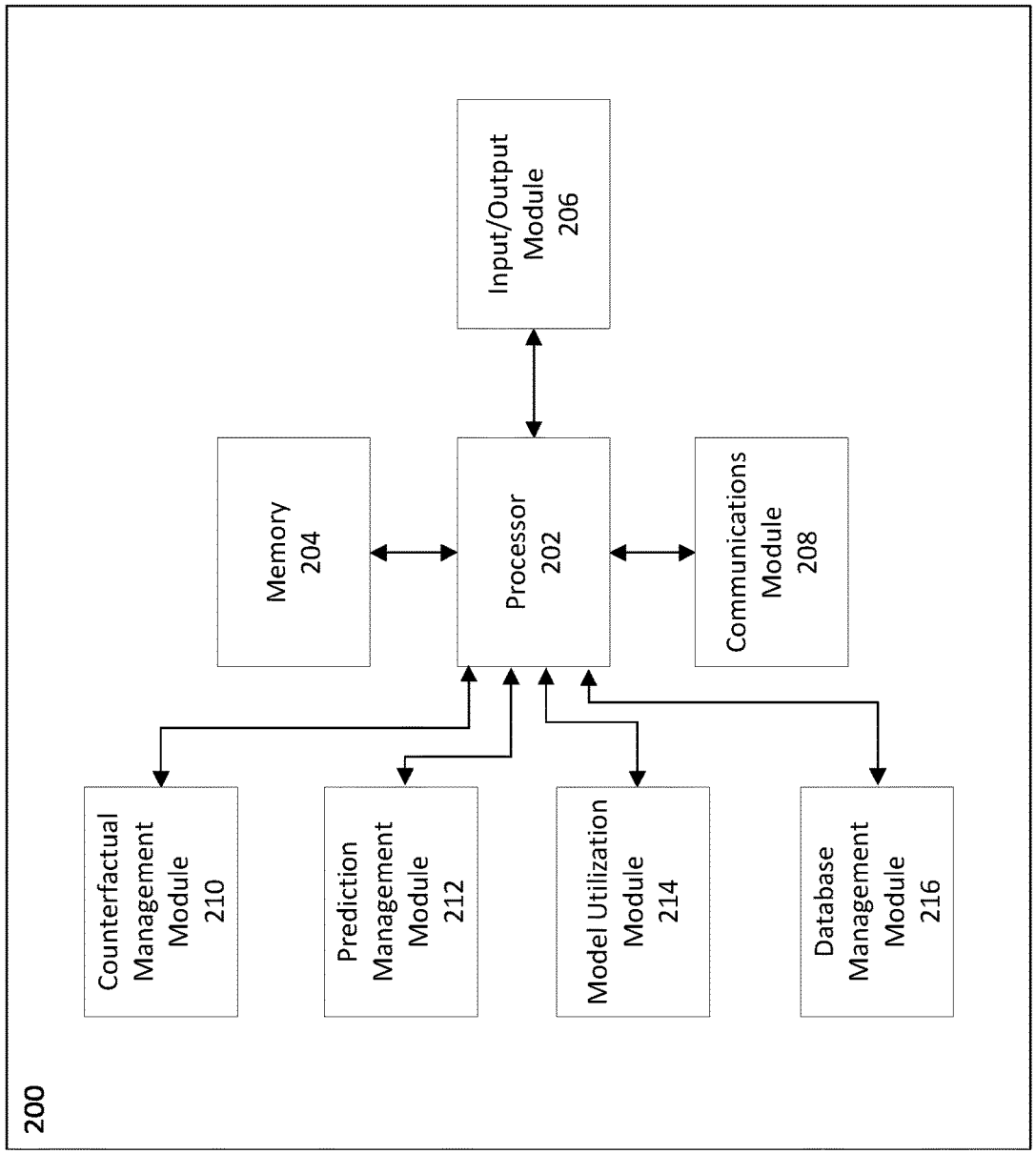
Figure 3:
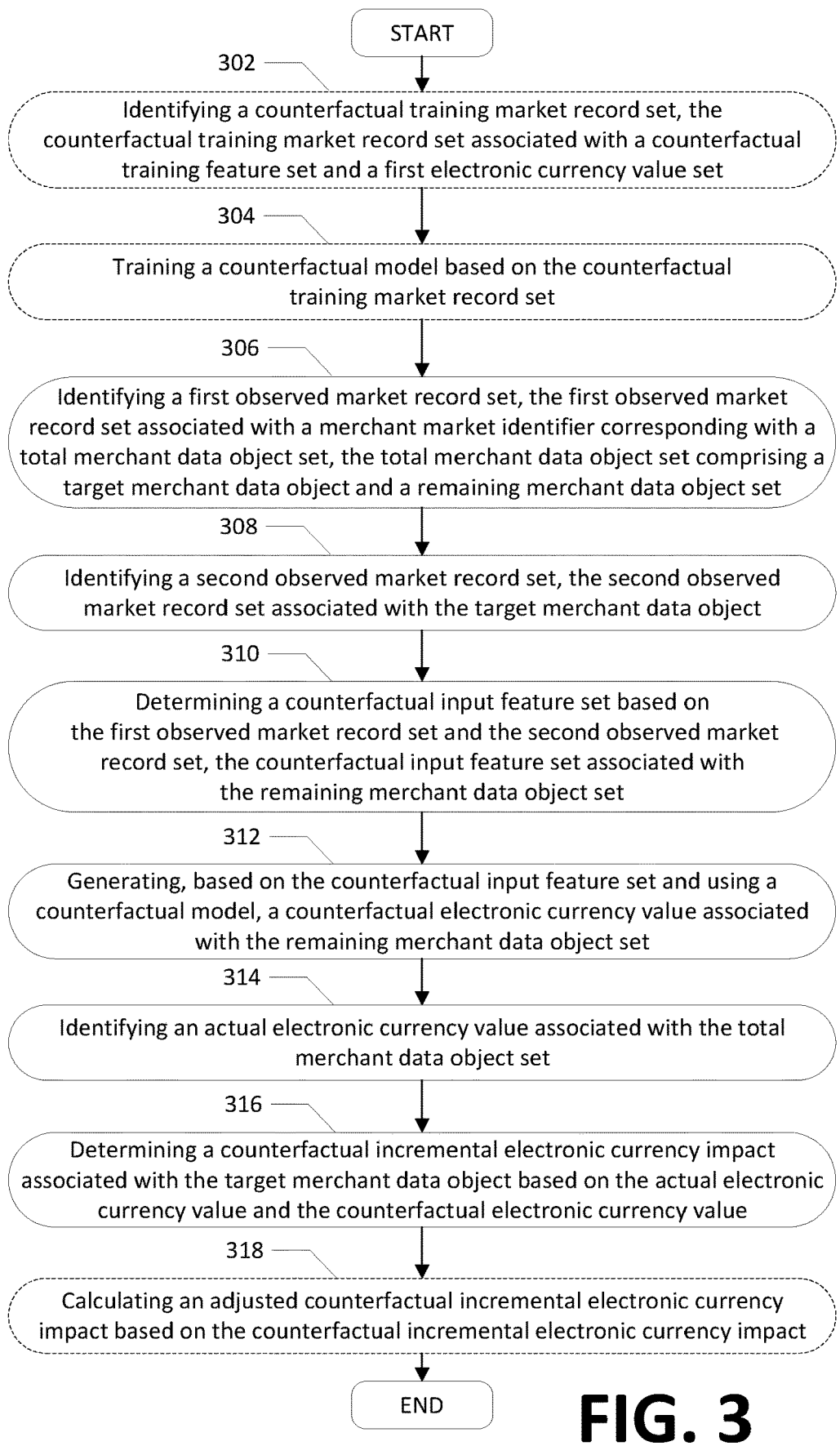
Figure 4:
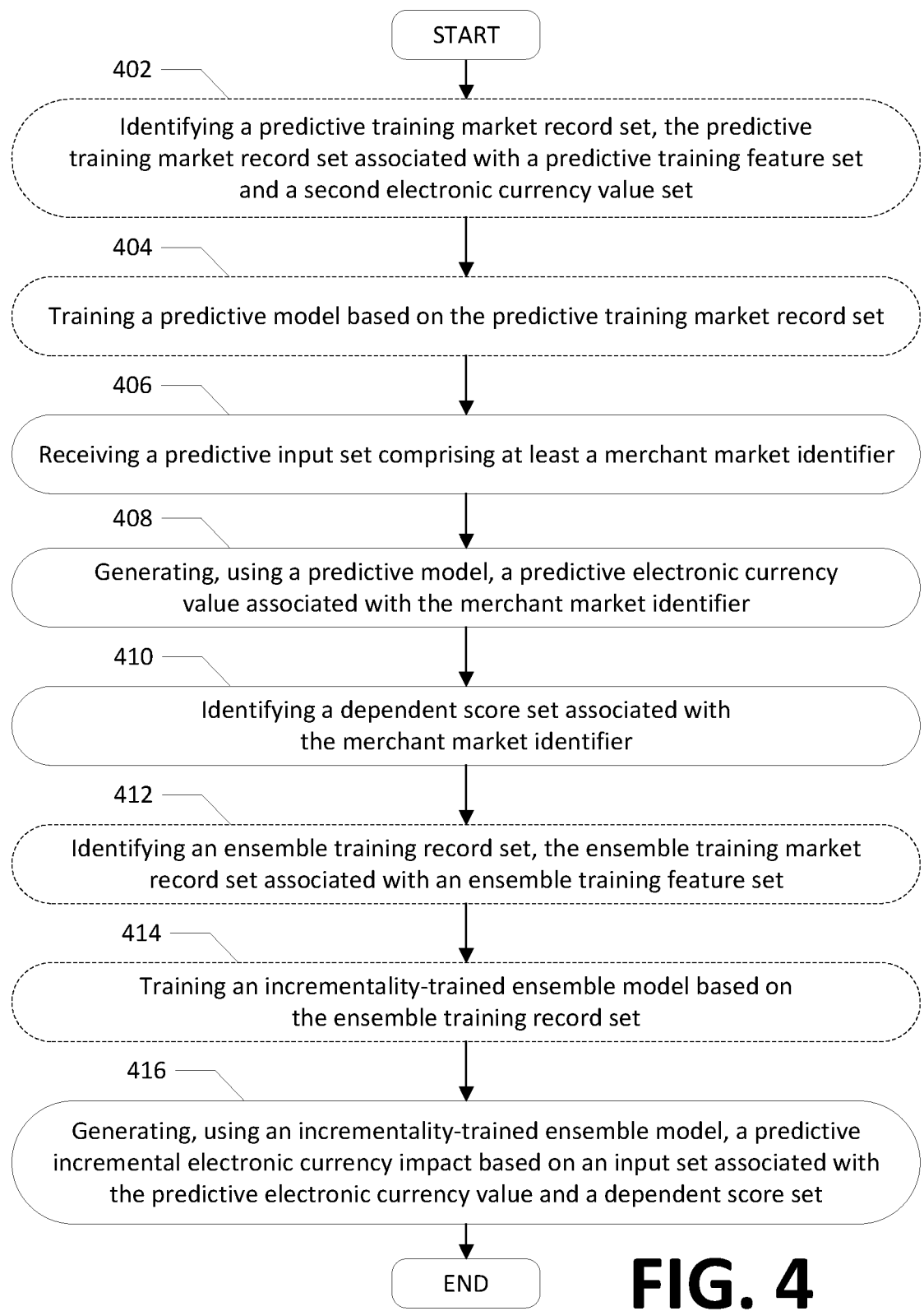
Figure 5:
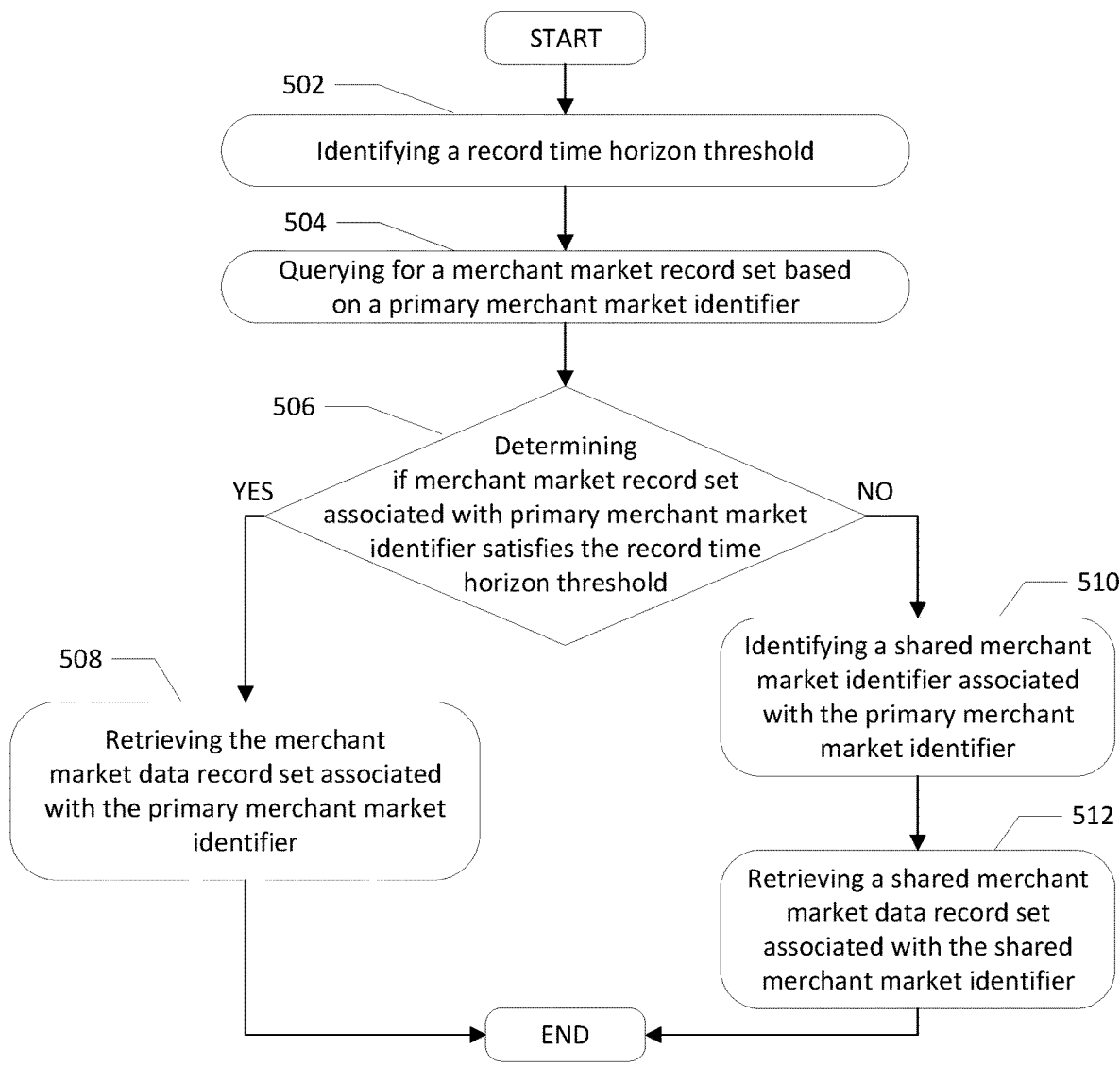
Figure 6:
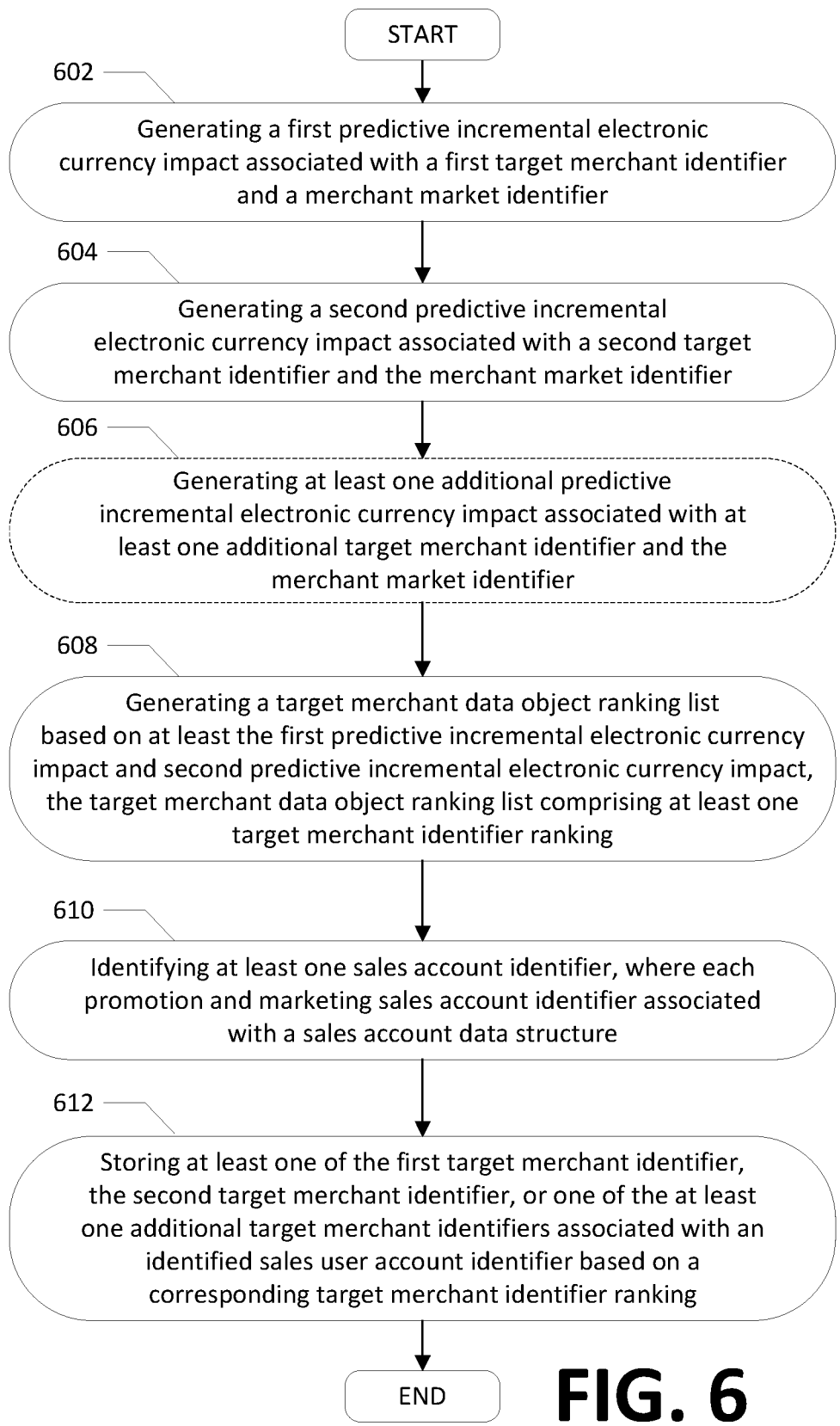
Figure 7:
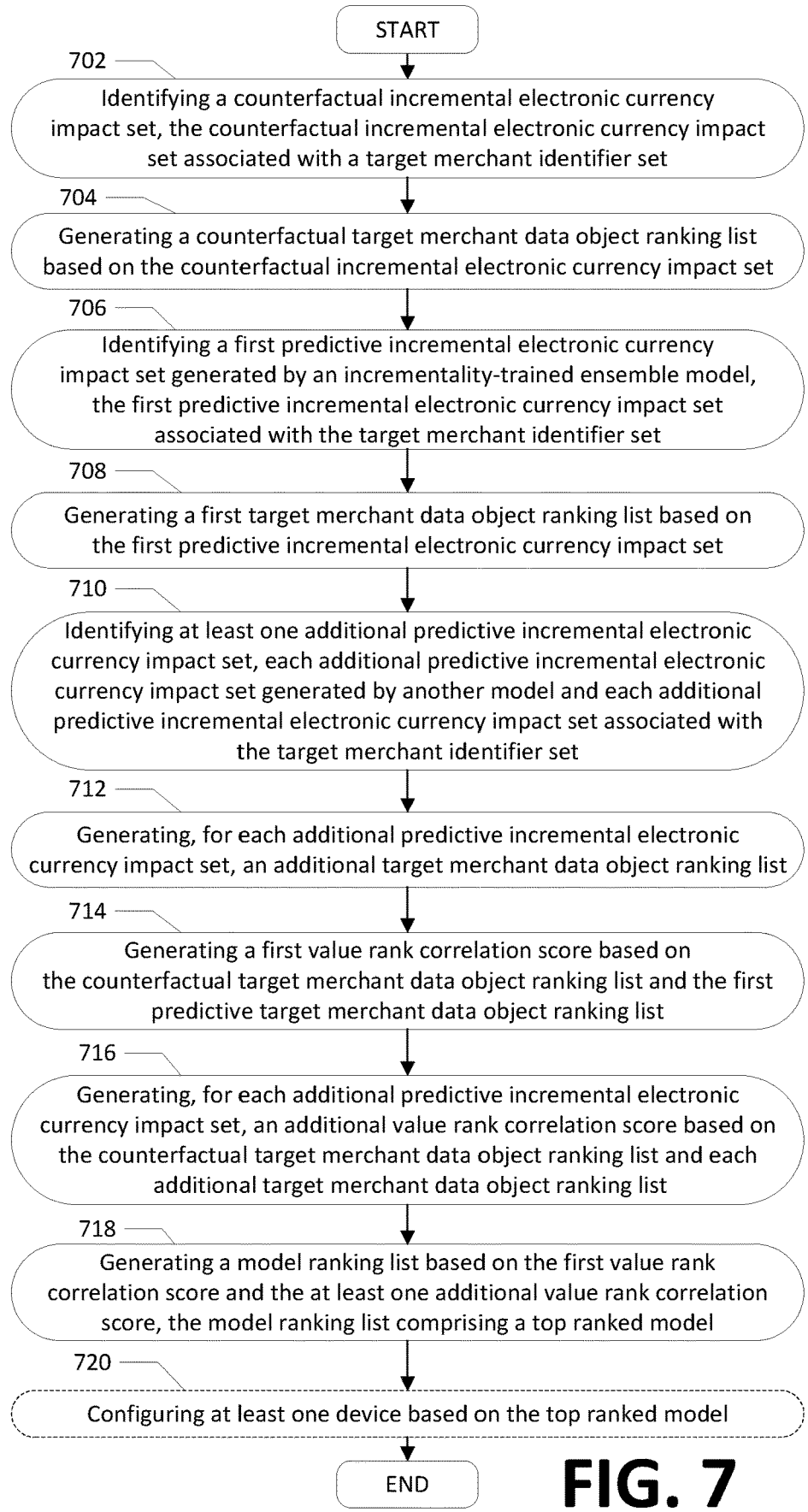

Having thus described the disclosure in general terms, reference will now be made to the accompanying drawings, which are not necessarily drawn to scale, and wherein:

FIG. 1 illustrates an example system within which example embodiments of the present disclosure may operate;

FIG. 2 illustrates a block diagram showing an example apparatus in accordance with example embodiments of the present disclosure;

FIG. 3 illustrates a flowchart describing example operations for generating a counterfactual incremental electronic currency impact utilizing, in part, a counterfactual model, in accordance with embodiments of the present disclosure;

FIG. 4 illustrates an example flowchart describing example operations for generating a predictive incremental electronic currency impact utilizing, in part, a predictive model, in accordance with embodiments of the present disclosure;

FIG. 5 illustrates a flowchart describing example operations for retrieving a market record set based on a record time horizon threshold, for use in training and/or otherwise configuring a predictive model, ensemble model, and/or counterfactual model, in accordance with some example embodiments of the present disclosure;

FIG. 6 illustrates a flowchart describing example operations for ranking merchant data objects, and assigning ranked merchant data objects to sales user account data structures, in accordance with example embodiments of the present disclosure; and FIG. 7 illustrates a flowchart describing an example process for ranking two or more models and, in some embodiments configuring at least one device based on a top ranked model, in accordance with example embodiments of the present disclosure.

DETAILED DESCRIPTION

Embodiments of the present disclosure now will be described more fully hereinafter with reference to the accompanying drawings, in which some, but not all, embodiments of the present disclosure are shown. Indeed, embodiments of the present disclosure may be embodied in many different forms, and should not be construed as limited to the embodiments set forth herein; rather, these embodiments are provided so that the disclosure will satisfy applicable legal requirements. Like numbers refer to like elements throughout.

Definitions

As used herein, the terms "data," "content," "information," and similar terms may be used interchangeably to refer to data capable of being captured, transmitted, received, displayed, and/or stored in accordance with various example embodiments. Thus, use of any such terms should not be taken to limit the spirit and scope of the disclosure. Further, where a computing device is described herein to receive data from another computing device, the data may be received directly from another computing device, or may be received indirectly via one or more intermediary computing devices, such as, for example, one or more servers, relays, routers, network access points, base stations, and/or the like. Similarly, where a computing device is described herein to send data to another computing device, the data may be sent directly to another computing device or may be sent indirectly via one or more intermediary computing devices, such as, for example, one or more servers, relays, routers, network access points, base stations, and/or the like.

The term "merchant" refers to, without limitation, a business owner, consigner, shopkeeper, tradesperson, vender, operator, entrepreneur, agent, dealer, organization, or the like that is in the business of or otherwise transacts in providing a good, service, or experience to a consumer, facilitating the provision of a good, service, or experience to a consumer and/or otherwise operating in the stream of commerce. For example, a merchant may be in the form of a running company that sells attire that is generally used by a person who runs or participates in athletic activities.

The terms "data object" and "object" refer to a computer-managed data structure or corresponding data values embodying various data fields in a structured format. In some embodiments where a data object is embodied by a particular computer-managed data structure, each data field in a data object is associated with an electronic type, such as a string, integer, double, float, char, or the like. In some embodiments, data objects are constructed for associated with real-world objects in an electronic format.

The term "deal data object" may include, but is not limited to, an electronically generated and/or managed data object representing any type of offered, presented, or otherwise indicated reward, discount, coupon, credit, deal, incentive, discount, media, or the like that is an indicative of a promotional value or the like that, upon purchase or acceptance, results in the issuance of an instrument that may be used toward at least a portion of the purchase of particular goods, services, and/or experiences defined by the deal.

The term "merchant data object" refers to an electronic data object that includes one or more data fields associated with a merchant. A merchant data object is associated with a "merchant identifier" comprising a string, number, or other human and/or machine-readable identification code by which the merchant data object may be uniquely identified. In some embodiments, the merchant data object includes biographical and/or geographical information, for example a merchant name, a merchant location, a merchant description, and the like. In some embodiments, a merchant data object includes a merchant category identifier field for correlating groups of merchant data objects based on similar classifications or properties (e.g., services/products offered). A merchant data object may be associated with a merchant market identifier, such that the merchant data object is retrievable via the merchant market identifier.

A merchant data object may be associated with one or more deal data objects. A deal data object may be made available for transaction (e.g., electronic interaction with the deal data object by a consumer computing device, where electronic interaction results in redemption, purchase, or the like) and thus the deal data object is referred to as "available," an "available data object" or an "available deal data object." The term "days available" and "available days" refers to a number of days a particular merchant data object is associated with at least one available deal data object within a particular timestamp interval (for example, the number of days available during a calendar month).

A deal data object may be specially featured (e.g., indicated and/or otherwise associated with data indicating the deal data object is to be prominently rendered for display within a user interface of a consumer computing device to promote or invite interaction by the consumer computing device with the deal data object), and thus during which the deal data object is referred to as "featured" or a "featured deal data object." The terms "days featured" and "featured days" refer to a number of days a particular merchant data object is associated with at least one featured deal data object within a particular timestamp interval (for example, the number of days available during a calendar month).

The terms "transacted", "transaction", and "tx", with respect to a deal data object, refer to electronically managed representations of interactions with deal data objects by consumer profile(s) via one or more consumer computing device(s). In some examples, a transaction occurs in response to an electronic interaction representing a previous action execution via a display interface of a consumer computing device, the action execution associated with a component rendered to enable purchasing a deal associated with the deal data object. Alternatively, in other examples, a transaction occurs in response to an electronic interaction representing a previous action execution via a display interface of a consumer computing device, the action execution associated with a component rendered to enable redeeming or claiming a deal.

The term "target merchant data object" refers to a particular merchant data object for which one or more processing actions with respect to merchant data object ranking, analysis, market addition, and/or market removal is to occur. In some embodiments, a target merchant data object refers to a particular merchant data object for which (1) a counterfactual incremental electronic currency impact is to be generated using a counterfactual model, or (2) a value rank correlation score and/or predictive incremental electronic currency impact is to be generated using a predictive model. Similarly, the term "target merchant identifier" refers to one or more items of data by which a merchant identifier associated with the target merchant data object may be uniquely identified.

The term "timestamp" refers to an electronic encoded string, number, or other representation corresponding to a network time. An example timestamp is encoded as a string containing at least a month and year. For example, the timestamp 03102019 refers to 10 Mar. 2019. In some example embodiments, a timestamp encodes at least a month and a year. In some embodiments, a timestamp encodes at least a day, a month, and a year. In other examples, a timestamp encodes minutes, hours, seconds, and the like, in addition to or in place of a day, a month, and/or a year.

The term "timestamp interval" refers to an electronic string, number, or other identifier that uniquely represents a range between two timestamps. A timestamp interval begins at a start timestamp and ends at an end timestamp. In some embodiments, a timestamp interval includes both the start timestamp and an end timestamp. For example in some embodiments the timestamp interval 01012019_03102019 represents the interval between timestamp 01012019 (1 Jan. 2019), and 03102019 (10 Mar. 2019).

In some embodiments, a timestamp interval includes a shortened identifier corresponding to a particular start timestamp and end timestamp. For example, the timestamp interval 032019 represents the period of time between a start timestamp of the beginning of March, 2019, and an end timestamp of the end of March 2019.

The term "observed period" refers to a historical timestamp interval, or plurality of historical timestamp intervals, for which data associated with one or more data objects was collected. In at least one example context, the term observed period refers to one or more historical timestamp intervals for which data associated with one or more market data objects was collected, such as in the form of one or more market records. In some embodiments, market records associated with an observed period are used to generate an actual or "observed" electronic currency value for the timestamp interval represented by the observed period.

The term "division identifier" refers to a unique string, number, or other value that uniquely identifies a defined geographic location. Examples of geographic identifiers include a latitude and longitude, a zip code, an address, a state, a province, or other defined boundary.

The term "service identifier" refers to a unique string, number, or other electronically managed data value that defines a particular market category, classification or defined group characteristic of various merchant data objects. In some embodiments, for example, a service identifier represents a merchant good category or merchant services category. In some embodiments, one or more merchant data objects is/are associated with a service identifier. Additionally or alternatively, in some embodiments, a market record is associated with a service identifier based on the merchant data object(s) corresponding to the market record.

The term "service header identifier" refers to a unique string, number, or other electronically managed data value that defines a linked single service identifier or linked plurality of service identifiers. A service header identifier represents a higher level characterization or categorization for linking similar service identifiers. In various example contexts, a service header identifier is associated with tens, hundreds, thousands, or more, service identifiers.

The term "merchant market identifier" refers to a string, number, or a combination thereof that identifies a particular group of merchant data objects based on one or more "sub-identifiers." A merchant market identifier is formed of one or more "sub_identifiers," where each "sub_identifier" refers to a component portion of a merchant market identifier that represents an identifier or merchant property value that is associated with or uniquely identifies independent groups of merchant data objects. For example, a non-limiting example of a merchant market identifier includes at least a service identifier and a division identifier as sub_identifiers. In some embodiments, a merchant market identifier includes additional sub_identifiers for further distinguishing a particular group of merchant data objects. In some embodiments, the sub-identifiers are concatenated with a reserved separator character that delineates sub_identifiers, for example an underscore, period, asterisk, or the like. Examples of a merchant market identifier include a universal unique identifier (UUID) and a human-readable identifier. Additionally, in some embodiments, a merchant market identifier includes, or is associated with, a timestamp interval, for example for use in retrieving a market record set corresponding with the merchant market identifier.

The term "shared merchant market identifier" refers to a particular merchant market identifier that is associated with multiple merchant data object groupings. A non-limiting example of a shared merchant market identifier includes a division identifier and a service header identifier, where the service header identifier is associated with a plurality of service identifiers. In other examples, the shared merchant market identifier includes a plurality of service identifiers (in addition to or in lieu of a service header identifier) and a division identifier. In some embodiments, a shared merchant market identifier additionally or alternatively comprises one or more associated merchant market identifiers, and/or other shared merchant market identifiers.

The term "merchant data object set" refers to a group of merchant data objects associated with a particular common merchant market identifier. A merchant data object set may include one or more target merchant data objects for which a predictive incremental electronic currency impact and/or counterfactual incremental electronic currency impact is to be generated, calculated, or otherwise determined. The terms "remaining merchant data object set" or "remaining merchant data object subset," refers to a group of one or more merchant data objects identified as associated with the particular merchant market identifier, where the group of merchant data objects does not include the one or more target merchant data objects. In some embodiments, where the merchant market identifier is not associated with any merchant data objects, the remaining merchant data object subset is empty.

The term "electronic currency value" refers to an electronically managed data representing a currency value associated with one or more transactions, transfers, purchases, or the like, of deal data objects. In some embodiments, each transaction is associated with a particular merchant data object, group of merchant data objects, and/or merchant market identifier corresponding to one or more merchant data object(s), over a particular timestamp interval.

An "incremental electronic currency impact" refers to a change in electronic currency value associated with merchant data object set that is associated with a particular merchant market identifier, where the change in electronic currency value is attributed to a target merchant data object or multiple target merchant data objects. For example, in one particular example context, an incremental electronic currency impact is associated with addition of a merchant data object to a particular group of one or more other merchant data object(s). In another particular example context, an incremental electronic currency impact is associated with removal of a merchant data object from a particular group of one or more other merchant data object(s).

The term "market record" refers to a particular electronically managed structured data object including one or more features associated with a particular timestamp interval. For example, in some embodiments, a market record includes at least electronically managed representations of summary, transmission, or other electronically transmitted information in response to user execution, via consumer computing devices, of transactions associated with deal data objects between consumer computing devices and a merchant data objects via a merchant-market management system. In some embodiments, a market record is associated with a particular merchant market identifier and/or a particular shared merchant market identifier. A market record is used in training and/or utilizing one or more models. In some embodiments, examples of features of a market record includes various data fields for summarizing transactions, electronic currency values, and the like.

The term "shared market data record set" refers to one or more market records retrievable from a repository, where each market record of the shared market data record set is associated with a common merchant market identifier. In some embodiments, shared market data records include, or are otherwise associated with, a service header identifier associated with the shared merchant market identifier.

The term "report time horizon threshold" refers to a hyperparameter associated with a predictive model and/or counterfactual model representing a required number of market records associated with a particular merchant market identifier in a repository in order for a market data record set associated with the particular merchant market identifier to be used with the predictive model and/or counterfactual model. In some embodiments, if the number of market records associated with a particular merchant market identifier does not satisfy the report time horizon threshold, a shared merchant market identifier is utilized instead of the merchant market identifier to retrieve a shared market data record set for use in training and/or utilizing a predictive model and/or counterfactual model.

The term "market data repository" refers to a database, sub-database, table, or permanent data storage configured for storing one or more market records. In some embodiments, a market data repository is one of many repositories embodied by a single database. Examples of a market data repository include a local repository, a cloud repository, and a hybrid repository.

The term "predictive model" refers to an algorithmic, statistical, or machine learning model, or a combination thereof, specially trained to generate a predictive electronic currency value associated with a merchant market identifier. A predictive model is trained using a particular market record set including or otherwise associated with a predictive model feature set and a target value data set, for example an electronic currency value data set. Examples of implementations for a predictive model includes one or more specially configured linear mixture models.

The term "incrementality-trained ensemble model" refers to an algorithmic, statistical, or machine learning model, or a combination thereof, specially trained to generate, calculate, or otherwise determine, a predictive incremental electronic currency impact for a target merchant data object and associated with a merchant market identifier. The incrementality-trained ensemble model is configured to generate predictive incremental electronic currency impacts that correspond to counterfactual incremental electronic currency impacts based on an input data set. In some embodiments, the incrementality-trained ensemble model is configured to generate, calculate, or otherwise determine the predictive incremental electronic currency impact based on one or more generated electronic currency values and/or other model scores. For example, in some embodiments the incrementality-trained ensemble model is configured to generate the predictive incremental electronic currency impact based on at least a predictive electronic currency value, generated by a predictive model, and a dependent score set generated by one or more dependent models.

The term "total predictive model" refers to a combination of one or more algorithmic, statistical, or machine learning models, specifically trained to generate a predictive incremental electronic currency impact for a target merchant data object and associated with a merchant market identifier using one or more sub-models therein. In some embodiments, a total predictive model includes at least a predictive model and an incrementality-trained ensemble model. In other embodiments, a total predictive model includes at least a predictive model, at least one dependent model, and an incrementality-trained ensemble model.

The term "predictive incremental electronic currency impact" refers to an incremental electronic currency impact that is associated with a future timestamp interval generated by a merchant-market management system. A predictive incremental electronic currency impact, in some embodiments, is generated using one or more machine learning, algorithmic, or statistical models. In an example embodiment, the predictive incremental electronic currency impact is generated using a predictive model and an incrementality-trained ensemble model.

The term "value rank correlation score" refers to an electronically managed data variable or value that represents an inaccuracy measurement between a predictive incremental electronic currency impact, or future electronic currency value, generated by a model, and counterfactual incremental electronic currency impact generated by a counterfactual model. In some embodiments, the value rank correlation score represents a Spearman rank correlation between the counterfactual incremental electronic currency impact and the predictive incremental electronic currency impact or future electronic currency value.

The term "counterfactual model" refers to a machine learning model specially trained to generate a counterfactual electronic currency value for a target merchant data object associated and a merchant market identifier. In some embodiments, a counterfactual model is trained using particular features of a particular market record set, for example a counterfactual training market record set. Examples implementations for counterfactual models include, but are not limited to, one or more algorithmic, statistical, or machine learning models, for example a linear mixture model.

The term "counterfactual electronic currency value" refers to an electronically managed representation of an estimated electronic currency value generated by a counterfactual model, and is associated with one or more merchant data objects not including a target merchant data object. In some embodiments, a counterfactual electronic currency value is associated with a timestamp interval, such as a record timestamp interval, that represents the period over which the counterfactual electronic currency value would have been generated.

The term "counterfactual incremental electronic currency impact" refers to an electronically managed representation of an increase in electronic currency value attributed to the addition of a target merchant data object to a merchant data object set, where the counterfactual incremental electronic currency impact is identified, generated, or otherwise determined based on an actual electronic currency value associated with the merchant data object set including the target merchant data object, and an a counterfactual electronic currency value estimated associated with the merchant data object set not including the target merchant data object. In some embodiments, the counterfactual incremental electronic currency impact is generated based on a calculation that utilizes the actual electronic currency value and the counterfactual electronic currency value. For example, in some embodiments, the counterfactual incremental electronic currency impact is generated by taking the difference between the actual electronic currency value less the counterfactual electronic currency value.

The term "dependent model score" refers to an electronically managed data representation of a value generated by a dependent machine learning, algorithmic, or statistical model for utilization as input for an incrementality-trained ensemble model. In some examples, a dependent model score represents a predicted electronic currency value for a merchant data object associated with a merchant market identifier. In one non-limiting example context, the dependent model score is associated with a particular timestamp interval, which represents the time period for which the dependent model score is predicted to be collected. For example, a dependent model score may represent a predicted electronic currency value and be associated with a timestamp interval that defines a calendar month, such that the dependent model score represents the predicted electronic currency value for a corresponding merchant data object associated with the calendar month.

The term "dependent model" refers to a machine learning model that is utilized to generate a dependent model score, where the dependent model score is utilized as input by an incrementality-trained ensemble model. In some embodiments, a dependent model is configured to generate a predictive electronic currency value or future electronic currency value associated with a target merchant identifier. The dependent model referred to herein is configured to generate a dependent model score for a target merchant associated with a particular merchant market identifier, where the dependent model score is utilized in generating a predictive incremental electronic currency impact.

The term "merchant data object ranking" refers to a numerical representation, generated by a merchant-market management system, of the predictive incremental electronic currency impact associated with a target merchant data object with respect to other merchant data objects associated with a merchant market identifier. In an example embodiment, a top (e.g., in some embodiments highest) merchant data object ranking associated with a merchant market identifier is generated for a target merchant data object associated with the highest predictive incremental electronic currency impact with respect to other merchant data objects associated with the merchant market identifier.

The term "model ranking" refers to a numerical or categorical representation of a rank correlation between the target merchant data object rankings generated by a particular machine learning, statistical, or algorithmic model and the target merchant data object rankings generated by a trusted machine learning, statistical, or algorithmic model. In an example context, for a machine learning, statistical, or algorithmic model configured to generate predicted target merchant data object rankings (e.g., a first predictive model), a corresponding model ranking is generated based on comparison between the target merchant data object rankings generated by the first predictive model and the target merchant data object rankings by the counterfactual model. In this regard, the counterfactual model may be regarded as the trusted model (e.g., a gold standard for ranking target merchant data objects). In some embodiments, a model ranking for a first model is generated based on a value rank correlation score generated for the first model as compared to the trusted model, where the value rank correlation score reflects the correlation between the target merchant data object rankings generated by the first model and the trusted merchant data object rankings generated by the trusted model. In some embodiments, a value rank correlation score for the trusted model is always 1.0 (e.g., the trusted model perfectly ranks itself), while the value rank correlation score for any other model may be less than or equal to this score. For example, in an example context, a model ranking is generated based on a value rank correlation score generated associated with a total predictive model in comparison to other value rank correlation scores generated for various other models, such as one or more dependent models, to be ranked.

The term "merchant offer data object" refers to a communication, email, message, or other transmission associated with a particular merchant data object and configured to be transmitted from the merchant-market management system to a merchant device associated with the merchant data object. A merchant offer data object includes an offer value at which the merchant may offer one or more deal(s) via the merchant-market management system.

The term "sales user account data structure" refers to an electronic data object associated with the merchant-market management system corresponding to a user of the merchant-market management system having permissions to utilize the merchant-market management system for managing one or more merchant data objects. In some embodiments a particular sales user account data structure is associated with one or more assigned merchant data objects for management by the sales user account data structure, for example for configuring and/or transmitting one or more merchant offers to the assigned merchant data objects.

Overview

Merchant-market management systems maintain a limited amount of resources, both computing resources and personnel resources, for allocation to various sales user account data structures for the management of various merchant data objects assigned to the sales user account data structures. When a target merchant data object is associated with a merchant market identifier, resources allocated to the target merchant data object may be based on the other merchant data objects currently associated with the merchant market identifier. For example, generating a predictive incremental electronic currency impact for a target merchant data object enables determination of the appropriate personnel and computing resources to target merchant data objects such that resources are unnecessarily and inefficiently allocated to low value target merchant data objects that do not require the allocated resources.

Advantageously in accordance with embodiments of the present disclosure, to generate a predictive incremental electronic currency impact, the target merchant data object is considered with respect to a merchant market identifier. In some contexts, merchant market identifier is pre-associated with or otherwise already associated with various merchant data objects. By generating a predictive incremental electronic currency impact for the target merchant data object with respect to the merchant market identifier, embodiments account for various mutual influence effects among the merchant data objects similarly associated with a particular merchant market identifier. For example, a target merchant data object may be associated with positive electronic currency value overall for a particular future timestamp interval (for example, the next 30 days, next month, next year, or the like) such that the target merchant data object originally appears to be appropriate for allocating significant resources towards, but a low predictive incremental electronic currency impact in a context where the target merchant data object cannibalizes deal transactions that would have occurred associated with existing merchant data objects already associated with a particular corresponding merchant market identifier had the target merchant data object not been introduced (in other words, the target merchant data object is taking would-be transactions away from existing merchant data objects already associated with the merchant market identifier rather than contributing new transactions for which computing and personnel resources should be allocated). If cannibalization is significant, resources allocated to the target merchant data object are wasted, as such resources must be reassigned with little (or no) improvement to the efficacy and efficiency of the system. Thus, a merchant-market management system is improved by improving the accuracy of generated predictive incremental electronic currency impacts to minimalize wasted resources allocated to such target merchant data object(s), such as to ensure proper balance of resources allocated to sales user account data structures and merchant data objects.

Embodiments include systems, apparatuses, methods, and computer program products for ranking merchant data objects for resource allocation by training and utilizing a total predictive model and counterfactual model. In some embodiments, all merchant data objects, or a subset thereof, are re-ranked corresponding to one or more associated merchant market identifiers. For example, in some embodiments, each merchant data object is selected as a target merchant data object one at a time for generating a predictive incremental electronic currency impact associated with the merchant data object and merchant market identifier. The merchant data objects associated with each merchant market identifier may then be ranked based on their corresponding predictive incremental electronic currency impact, and resources may be allocated based on the rankings of each merchant data object.

In some embodiments, the counterfactual model is configured for generating a counterfactual electronic currency value for use in generating one, or more, counterfactual incremental electronic currency impact(s). Additionally or alternatively in some embodiments, the total predictive model comprises at least a predictive model and an incrementality-trained ensemble model. The incrementality-trained ensemble model may be configured to generate predictive incremental electronic currency impacts that track counterfactual incremental electronic currency impacts generated, identified, calculated, or otherwise determined based on the counterfactual electronic currency values generated by the counterfactual model. In this regard, the counterfactual incremental electronic currency impact may serve as a trusted estimate of the incremental electronic currency impact attributed to a target merchant data object, which the incrementality-trained ensemble model may use as a target for its predictions.

In some embodiments, the predictive model is configured for generating a predictive electronic currency value for a merchant market identifier, and an incrementality-trained ensemble model for generating a predictive incremental electronic currency impact for a target merchant identifier and the merchant market identifier. Some embodiments utilize the predictive model for generating a predictive electronic currency value for a target merchant data object associated with a merchant market identifier by utilizing a specially trained machine learning model. The predictive model may be trained to generate the predictive electronic currency value based on a historical market record set collected, retrieved, or otherwise obtained by the merchant-market management system. Additionally or alternatively, in some embodiments the counterfactual model is trained to generate the counterfactual electronic currency value based on another, or the same, historical market record set. Each market record may include summary data associated with a merchant market identifier over a particular record timestamp interval, where the summary data includes a feature set comprising various data fields. For example, each market record may include the data fields described in Table 1. Each market record may be associated with a merchant market identifier and a particular timestamp interval (for example, one calendar month), included as features of the market record. It should be appreciated that, in some embodiments, a market record includes additional or alternative data fields to those described in Table 1.

TABLE 1

Example Market Record Fields

| Field Name | Data Type | Description |
| --- | --- | --- |
| Division_identifier | String | A geographic or other dividing identifier associated with a subset of merchant data objects. May be a component of the merchant market identifier associated with the market record. |
| Service_identifier | String | A service identifier associated with one or more market data objects. May be a component of the merchant market identifier associated with the market record. |
| Service_header_id | String | A service header identifier associated with at least one service identifier. May be a component of the merchant market identifier associated with the market record. |
| Num_of_merchants_available | Integer | Number of merchant data objects associated with at least one live deal object, promotion object, or similar offering object via the merchant-market management system during the timestamp interval. |
| Num_of_merchants_featured | Integer | Number of merchant data objects associated with at least one featured deal object, promotion object, or similar offering object via the merchant-market management system during the timestamp interval. |
| Num_of_merchants_with_tx | Integer | Number of merchant data objects associated with at least one transaction during the timestamp interval. |
| Total_available_days | Integer | Sum of the number of available days from each merchant data object associated with the merchant market identifier during the timestamp interval. |
| Total_featured_days | Integer | Sum of the number of featured days from each merchant data object associated with the merchant market identifier during the timestamp interval. |
| Total_transactions | Integer | Sum of the number of transactions from each merchant associated with the merchant market identifier during the timestamp interval. |
| Gb | Double | Gross electronic currency value for the merchant data objects associated with the record over the identified timestamp interval. |

TABLE 1-continued

Example Market Record Fields

| Field Name | Data Type | Description |
|---|---|---|
| Record_timestamp_interval | String | Timestamp interval covered by the record. In some embodiments, may be in a different electronically managed data format (e.g., using Date formats or DateRange formats). |

A counterfactual model may be embodied by one or more machine learning models. For example, a counterfactual model may be embodied by a linear mixture machine learning model configured to generate a counterfactual electronic currency value.

The counterfactual model is configured to output estimated values, or in other words values associated with a historical timestamp interval rather than a future timestamp interval, so as to describe the data inputs. Thus, a robust set of features may be chosen from Table 1 that may not be usable by the predictive model.

The inventors have identified a linear mixture model implementation as an example counterfactual model to provide satisfactory counterfactual estimation generation accuracy, generalizability, and merchant data object ranking, as further discussed below. Such implementations provide improved accuracy, generalizability, and corresponding rankings with reduced errors in generation and ranking. In this regard, in one such example context, the following model formula is implemented via a corresponding counterfactual model:

$$\log(GB_{merchant\_market\_identifier, timestamp\_interval}) =$$
$$\beta_{0,group} +$$
$$\beta_{1,group} n_{merchant\_market\_identifier, timestamp\_interval, available} +$$
$$\beta_{2,group} n_{merchant\_market\_identifier, timestamp\_interval, featured} +$$
$$\beta_{3,group} n_{merchant\_market\_identifier, timestamp\_interval, transaction} +$$
$$\beta_{4,group} \log(n_{merchant\_market\_identifier, timestamp\_interval, total\_available\_days}) +$$
$$\beta_{5,group} \log(n_{merchant\_market\_identifier, timestamp\_interval, total\_featured\_days}) +$$
$$\beta_{6,service\_header, timestamp\_interval} month\_ind + e_{merchant\_market\_identifier, timestamp\_interval}$$

In the above formula, $n_{merchant\_market\_identifier, timestamp\_interval, available}$ represents a number of merchant data objects associated with available deal objects, promotion objects, or the like, during the timestamp interval. $n_{merchant\_market\_identifier, timestamp\_interval, featured}$ represents a number of merchant data objects associated with featured deal objects, promotion objects, or the like, during the timestamp interval. $n_{merchant\_market\_identifier, timestamp\_interval, transaction}$ represents a number of merchant data objects associated with transacted deal objects, promotion objects, or the like, during the timestamp interval.

$n_{merchant\_market\_identifier, timestamp\_interval, total\_available\_days}$ represents the total number of available days for all merchant data objects associated with the merchant market identifier (or shared merchant market identifier) during the timestamp interval. $n_{merchant\_market\_identifier, timestamp\_interval, total\_featured\_days}$ represents the total number of featured days for all merchant data objects associated with the merchant market identifier (or shared merchant market identifier) during the timestamp interval.

In some embodiments, the group factor of the above formula may correspond to a merchant market identifier or a shared merchant market identifier, based on a report time horizon threshold and a number of available market records associated with the merchant market identifier. When the number of market records associated with the merchant market identifier does not satisfy the report time horizon threshold, such market records may be insufficient to accurately use to train the counterfactual model. In such circumstances, a shared market record set may be retrieved instead based on a shared merchant_market_identifier (e.g., a service header identifier). The shared merchant_market_identifier may be a higher level identifier associated with multiple merchant market identifiers that are considered similar. By using the shared market records, predictive models of the present disclosure address problems with data sparsity and improve generalizability of the models. The retrieved market records may then be used to train the counterfactual model and/or generate a counterfactual incremental electronic currency impact.

The above counterfactual model formula may also be implemented using various known computing languages. For example, the formula may be implemented using the R computing language. The following formula, for example, may be used in R:

log_gb~num_of_merchants_available+num_of_merchants_featured+num_of_merchants_with_tx+
log_total_available_days+log_total_featured_days+timestamp_interval+(0+timestamp_interval|service_header)+(num_of_merchants_available+num_of_merchants_featured+num_of_merchants_with_tx+log_total_available_days+
log_total_featured_days||group)

In some such contexts, for example, the counterfactual model is a descriptive model, as opposed to a forward-looking model such as the prediction-based total predictive model. The counterfactual model may be implemented using features that are more granular, or otherwise unsuitable for use in training or otherwise utilizing the predictive model, due to the applicability of such features towards forward-looking projecting. Thus, in some embodiments, a counterfactual model and a predictive model are trained using a single market record set, but utilize different fields from the market record set.

Additionally or alternatively, in some embodiments a predictive model is provided. In some such embodiments, a predictive model is embodied by one or more machine learning models. For example, a predictive model may be embodied by a linear mixture machine learning model configured to generate a predictive electronic currency value.

The predictive model is configured to output predictive values, or in other words values associated with a future timestamp interval rather than a historical timestamp interval Thus, the fields chosen from Table 1 must be selected to not cause data leakage. Accordingly, it should be understood that not all the fields included in a market record may be used to train the predictive model.

The inventors have identified a linear mixture model implementation as an example predictive model to provide satisfactory prediction accuracy and generalizability, as further discussed below, with reduced errors in the resulting generated predictions. In this regard, the following model formula may be implemented via a corresponding predictive model:

$$\log(GB_{merchant\_market\_identifier, timestamp\_interval}) = \beta_{0,group} +$$

$$\beta_{1,group} n_{merchant\_market\_identifier, timestamp\_interval} +$$

$$\beta_{2,group} n_{merchant\_market\_identifier, timestamp\_interval}^2 +$$

$$\beta_{3,service\_header, timestamp\_interval} \text{timestamp\_ind} +$$

$$e_{merchant\_market\_identifier, timestamp\_interval}$$

In the above formula, $n_{merchant\_market\_identifier, timestamp\_interval}$ represents a number of merchant data objects having available deals active associated with the merchant market identifier (represented by merchant_merket_identifier) within the particular timestamp interval (represented by timestamp_interval). A default_timestamp_interval may correspond to a calendar month.

The above formula may be implemented using various known computing languages. For example, the formula may be converted into the R computing language for efficient implementation. The following formula, for example, may be used in R:

log_gb~num_of_merchants+num_of_merchants_sqr+
       timestamp_interval+(0+timestamp_interval|ser-
       vice_header_id)+(num_of_merchants+num_of_
       merchants_sqr||group).

In the above R formula, the vertical bar (|) represents a first random effect within the given group, and the double vertical bar (||) represents a second random effect within the given group that is independent from the first random effect. It should also be appreciated that the random effect of timestamp_interval within service_header_id accounts for seasonality under service header. Alternatively, a formula may be implemented that does not account for seasonality with the service_header. The following formula, for example, may be used in R:

log_gb~num_of_merchants+num_of_merchants_sqr+
       timestamp_interval+num_of_merchants+nu-
       m_of_merchants_sqr||group)

In some embodiments, the group factor may correspond to a merchant market identifier or a shared merchant_market_identifier, based on a report time horizon threshold and a number of available market records associated with the merchant_market_identifier. When the number of market records associated with the merchant_market_identifier does not satisfy the report time horizon threshold, such market records may be insufficient to accurately use to train the predictive model. In such circumstances, a shared market record set may be retrieved instead based on a shared merchant_market_identifier (e.g., a service header identifier). The shared merchant_market_identifier may be a higher level identifier associated with multiple merchant market identifiers associated with at least a portion of different market data objects that are considered similar. By using the shared market records, predictive models of the present disclosure address problems with data sparsity and improve generalizability of the models. The retrieved market records may then be used to train the predictive model and/or generate a predictive incremental electronic currency impact.

It is important that generated predictive incremental electronic currency impacts are within an acceptable accuracy range, and ideally as accurate as possible without detrimentally affecting generalizability and/or robustness. However, historical market records reflect actual occurrences, and thus cannot be used to certifiably determine whether an electronic currency value for a particular merchant data object in fact incremental with regard to a group of merchant data objects or due to mutual influence effects on other merchant data objects in the group.

The predictive model may include, be associated with, and/or otherwise function in conjunction with an incrementality-trained ensemble model trained to generate a predictive incremental electronic currency impact. The incrementality-trained ensemble model may be utilized to generate the predictive incremental electronic currency impact for a target merchant data object associated with a merchant market identifier by utilizing a second specially trained machine learning model. The incrementality-trained ensemble model may be trained to generate the predictive incremental booking value based on an input set, which may include at least a dependent score set and the predictive electronic currency value for the merchant market identifier. In some embodiments, the input set may include or be associated with a feature set including at least one or more features including features described in Table 2. The feature set may be generated via a combination of one or more dependent model score(s) and the output from the predictive model. The features, in some example embodiments, are on a merchant-market level associated with a merchant market identifier, and refreshed at a particular timestamp interval (e.g., daily, weekly, or the like). The feature set may be associated with, or include the target value to be generated by the incrementality-trained ensemble model. For example, as depicted in Table 2, the target value may be the incremental booking value over a particular timestamp interval, for example 30 days, represented by the iGB30 feature. In this regard, multiple predictive incremental booking values may form an electronic currency value set included in, or associated with, an input feature set. It should be appreciated that, in other embodiments, the input set may include additional or alternative features to those described in Table 2.

TABLE 2

| Example Incrementality-Trained Ensemble Model Input Feature Set | | |
|---|---|---|
| Field Name | Data Type | Description |
| Merchant_identifier | String | A merchant identifier that uniquely identifies a particular merchant entity. In |

TABLE 2-continued

Example Incrementality-Trained Ensemble Model Input Feature Set

| Field Name | Data Type | Description |
| --- | --- | --- |
| | | some embodiments, may be associated with a third-party service, system, or the like, for managing merchant data or customer relations (for example, CRM systems). |
| Division_identifier | String | A geographic or other dividing identifier associated with a subset of merchant data objects. |
| Service_identifier | String | A service identifier associated with one or more market data objects. |
| Service_header_id | String | A service header identifier associated with at least one service identifier. |
| Predicted_gb_k_capped_curr_mkt | Double | Capped predictive electronic currency value for the merchant market identifier for a current timestamp interval (for example the current month). |
| Predicted_gb_k_plus_1_capped_curr_mkt | Double | Capped predictive electronic currency value for the merchant market identifier including an additional merchant for a current timestamp interval (for example the current month). |
| Sum_dependent_model_scores_curr_mkt | Double | Sum of dependent model scores for the merchant data objects associated with the merchant market identifier for the current timestamp interval (for example the current month). |
| Pred_gb_k_capped_nxt_mkt | Double | Capped predictive electronic currency value for the merchant market identifier for a next timestamp interval (for example the next month). |
| Pred_gb_k_plus_1_capped_nxt_mkt | Double | Capped predictive electronic currency value for the merchant market identifier including an additional merchant for a next timestamp interval (for example the next month). |
| Sum_dependent_model_scores_nxt_mkt | Double | Sum of dependent model scores for the merchant data objects associated with the merchant market identifier for the next timestamp interval (for example the next month). |
| Record_timestamp_interval | String | Timestamp interval for which the above values are determined. In some embodiments, this is a partition column. |
| iGB30 | Double | Counterfactual incremental electronic currency impact for a particular merchant market identifier estimated using a counterfactual model. |

An incrementality-trained ensemble model may be embodied by one or more machine learning models. For example, an incrementality-trained ensemble model may be embodied by an ensemble statistical, algorithmic, or machine learning model, or a combination thereof, configured to generate the predictive incremental electronic currency impact based on the input set.

The incrementality-trained ensemble model may be configured to output predictive incremental electronic currency impacts, or in other words electronic currency values associated with a future timestamp interval rather than a historical timestamp interval. Additional features may be used to train the incrementality-trained ensemble model. However, such features should be appropriate for predictive modeling to prevent data processing problems, such as data leakage.

The inventors have identified an example ensemble machine learning model implementation as having satisfactory accuracy and efficiency while reducing erroneously generated values. In this regard, the following model formula may be implemented via a corresponding ensemble machine learning model:

$$\log(iGB_{merchant\_identifier,market\_identifier,day}) =$$
$$\beta_{0,division\_identifier} + \beta_{1,division\_identifier}$$
$$\log(x_{dependent\_model\_score,merchant\_identifier,market\_identifier,day})$$
$$+ \beta_{2,division\_identifier} \log(x_{curr-pred,market\_identifier,day}) + \beta_{3,division\_identifier}$$
$$\log(x_{curr-pred-plus,market-identifier,day})$$
$$+ \beta_{4,division\_identifier}$$
$$\log(x_{curr-sum-dependent\_model\_scores,market\_identifier,day}) + \beta_{5,division\_identifier}$$
$$\log(x_{nxt-pred,market\_identifier,day}) + \beta_{6,division\_identifier}$$
$$\log(x_{nxt-pred-plus,market\_identifier,day})$$
$$+ \beta_{7,division\_identifier}$$
$$\log(x_{nxt-sum-dependent\_model\_scores,market\_identifier,day}) + \beta_{0,service\_identifier} + \beta_{1,service\_identifier}$$
$$\log(x_{dependent\_model\_score,market\_identifier,day})$$
$$+ \beta_{2,service\_identifier}$$
$$\log(x_{curr-pred,market\_identifier,day}) + \beta_{3,service\_identifier}$$
$$\log(x_{curr-pred-plus,market-identifier,day})$$
$$+ \beta_{4,service\_identifier}$$
$$\log(x_{curr-sum-hero,market\_identifier,day})$$
$$+ \beta_{5,service\_identifier}$$
$$\log(x_{nxt-pred,market\_identifier,day}) + \beta_{6,service\_identifier}$$
$$\log(x_{nxt-pred-plus,market\_identifier,day})$$
$$+ \beta_{7,service\_identifier}$$
$$\log(x_{nxt-sum-hero,market\_identifier,day}) +$$
$$e_{merchant\_identifier,market\_identifier,day}$$

The above formula may similarly be implemented using various known computing languages. For example, the formula may be converted into the R computing language for efficient implementation. The following formula, for example, may be used in R:

```
log_igb~log_depdendent_model_score+
   log_pred_gb_k_capped_curr+log_pred_gb_k_
   capped_nxt+
   log_pred_gb_k_plus_1_capped_curr+
   log_pred_gb_k_plus_1_capped_nxt+log_sum_
   dependent_model_scores_curr_mkt+log_sum_
   dependent_model_scores_nxt_mkt+(log_depen-
   dent_model_score+log_pred_gb_k_capped_
   curr+log_pred_gb_k_capped_nxt+
   log_pred_gb_k_plus_1_capped_curr+
   log_pred_gb_k_plus_1_capped_nxt+log_
   sum_depndent_model_score_curr_mkt+log_
   sum_dependent_model_score_nxt_mkt||division_
   identifier)+(log_dependent_model_score+
   log_pred_gb_k_capped_curr+log_pred_gb_k_
   capped_nxt+
   log_pred_gb_k_plus_1_capped_curr+
   log_pred_gb_k_plus_1_capped_nxt+
   log_sum_hero_curr+
   log_sum_dependent_model_score_nxt_mkt||servi-
   ce_identifier)
```

The symbols presented in the above formula may have the same meanings described above with respect to the predictive model formula. For purposes of brevity, this functionality is omitted here so as to not repeat the same disclosure.

The generated predictive incremental electronic currency impact (igb as indicated in the above formula) may be used in one or more actions associated with the target merchant data object and/or other merchant data objects. For example, some embodiments utilize the predictive incremental electronic currency impact to assign the target merchant data object to a sales user account data structure for management. In some embodiments, a predictive incremental electronic currency impact is generated for multiple different merchant data objects associated with a particular merchant market identifier. Embodiments may generate merchant data object rankings for the merchant data objects associated with the particular merchant market identifier, for example based on the generated predictive incremental electronic currency impacts. In some embodiments, the merchant data object rankings may be embody a particular merchant data object ranking. For example, for a given merchant market identifier associated with N merchants, where N is a number, a predictive model may be utilized to generate a predictive incremental electronic currency impact for each of the N merchant data objects, and then generate a merchant ranking list including generated merchant data object rankings associated with the various merchant data objects (the N merchant data objects) utilizing the generated predictive incremental electronic currency impacts.

The predictive incremental electronic currency impacts need not, in some embodiments, be numerically similar to a corresponding counterfactual incremental electronic currency impact. In some embodiments, the ranking of the target merchant data objects may be maintained. By maintaining the merchant data object rankings between target merchant data objects, the top ranked target merchant data object is always associated with the greatest predictive incremental electronic currency impact. In other words, regardless of the value of the greatest predictive incremental electronic currency impact associated with the top ranked merchant data object, an accurate model may produce the predictive incremental electronic currency impacts such that the top ranked merchant data object is always most like to be the best addition to market defined by the merchant market identifier and corresponding merchant data object set.

SYSTEM ARCHITECTURE AND EXAMPLE APPARATUS

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, or a computer workstation. Further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 illustrates an example computing system within which embodiments of the present disclosure may operate. FIG. 1 illustrates an overview for a system 100 configured for generating a counterfactual incremental electronic currency impact and/or predictive incremental electronic currency impact for one or more target merchant data objects. Additionally or alternatively, the system 100 may be configured for utilizing the predictive incremental electronic currency impact and/or counterfactual incremental electronic currency impact to generate a merchant offer data object, generate one or more merchant data object rankings, such as in a merchant ranking list, and/or store a target merchant data object for management by a sales user account data structure.

The system 100 includes merchant-market management system 102, consumer devices 108A-108N, and merchant devices 110A-110N. The merchant-market management system 102 may be configured to generate, maintain, and/or offer one or more deal data objects, for example to the consumer devices 108A-108N. Each deal data object may be associated with a merchant device 110A-110N, for example via a merchant data object identifier that manages and/or otherwise facilitates offering access and/or transacting of the deal data object.

Additionally, the merchant-market management system 102 may be configured for generating a predictive incremental electronic currency impact using a total predictive model and/or utilizing the predictive incremental electronic currency impact. For example, the merchant-market management system 102 may be configured for maintaining, accessing, and/or otherwise utilizing a predictive model and an incrementality-trained ensemble model. The merchant-market management system 102 may also be configured for generating a counterfactual electronic currency value using a counterfactual model, and/or utilizing a counterfactual incremental electronic currency impact. The merchant-market management system 102 may be configured to generate, or otherwise determine, a counterfactual incremental electronic currency impact based on at least the counterfactual electronic currency value generated by the counterfactual model.

The database 106 may embody, include, or otherwise be associated with one or more databases and/or other repositories containing electronic data associated with various electronically managed data objects, or associated information, used by the merchant-market management system 102. For example, the database 106 may be configured to store deal data objects or corresponding information, merchant data objects, merchant market data objects associated with a merchant market identifier, market records, user account data structures (including sales user account data structures), merchant offer objects, and the like. Additionally or alternatively, the database 106 may store configurations, feature sets, and/or parameters or hyperparameters for training and/or utilizing one or more of the predictive model, incrementality-trained ensemble model, and/or counterfactual model. In some embodiments, the database 106 includes an independent repository for each type of electronically managed data object. In other embodiments, the database 106 includes a single repository configured for storing all types of electronically managed data objects, such that the single repository functions as the multiple sub-repositories.

It should be appreciated that the database 106 may be embodied by various known database implementations. For example, in some embodiments the database 106 is embodied by one or more SQL databases. In other embodiments, the database 106 is embodied by one or more no-SQL databases. Document-based or relational databases may be used in some embodiments.

The server 104 may be communicable with the database 106. In some embodiments, the database may be managed directly by the server 104, or physically associated with the server 104. In other embodiments, the server 104 may communicate with the database 106 through one or more networks. For example, the database 106 may be stored remotely from the server 104, such that the server 104 communicates with the database 106 through a network such as the network 112.

The merchant-market management system 102 may be configured to perform the operations described herein via the server 104 and the database 106. The server 104 may include computer program code for performing one or more operations described herein via the hardware of server 104. The server may also communicate with the database 106 to enable the merchant-market management system 102 to store to, read from, and otherwise manage the database 106. For example, the server 104 may communicate with the database 106 to access one or more selected from the group of a merchant repository, market data repository, dependent model repository, promotion and deals repository, dependent model repository and the like.

The merchant-market management system 102 may communicate with one or more consumer devices functioning as client devices for accessing services associated with the merchant-market management system 102. For example, a user may, via one of the consumer devices 108A-108N, input information to be used in generating a counterfactual electronic currency value via a counterfactual model, or a predictive incremental electronic currency impact using a total predictive model. For example, in some embodiments, a user may input a particular target merchant identifier and/or merchant market identifier for which the values are to be generated. In some embodiments, the one of the consumer devices 108A-108N may be configured to execute and/or otherwise provide one or more interfaces, applications, or the like for facilitating communication and transmission between the consumer device 108A-108N and the merchant-market management system 102.

The merchant-market management system 102 may communicate with one or more of the consumer devices 108A-108N via the network 112. The merchant-market management system 102 is configured to transmit deal data objects to the various consumer devices 108A-108N, and receive transaction data associated with the deal data objects from the various consumer devices 108A-108N. In some embodiments, the merchant-market management system 102 is further configured to collect information, such as transaction information, deal information, promotion information, or the like, associated with transmissions to or from each of the consumer devices 108A-108N, and store such information in the database 106. For example, the merchant-market management system 102 may store information associated with available deals, information associated with featured deals, and information associated with transacted deals in the database 106.

The merchant-market management system 102 may communicate with one or more of the merchant devices 110A-110N via the network 112. The merchant-market management system 102 may maintain a merchant data object that represents and/or is associated with each of the merchant devices 110A-110N. Each merchant data object may be associated with various deal data objects made available by the merchant devices 110A-110N and available to the consumer devices 108A-108N for transacting via the merchant-market management system 102. The merchant-market management system 102 may communicate with the merchant devices 110A-110N to collect information associated with each of the merchant devices 110A-110N, and utilize the collected information to generate merchant data objects, merchant market data objects, or the like. For example, the merchant-market management system 102 may collect merchant category information, merchant location information, merchant product information, merchant service information, and/or merchant transaction information from the merchant devices 110A-110N. In some embodiments, the merchant-market management system 102 is configured to communicate with one or more of the merchant devices 110A-110N for transmitting corresponding deal data object(s).

The information collected from the consumer devices 108A-108N, merchant devices 110A-110N, and/or information generated by the merchant-market management system 102, may be utilized to generate and store one or more market records. For example, the merchant-market management system 102 may generate a market record and store it in database or repository, such as database 106 or a market data repository associated with database 106. The merchant-market management system 102 may generate the market record associated with a particular record timestamp interval over which the data or information summarized by the market record was collected.

The merchant-market management system 102 may be embodied by one or more computing systems, such as the apparatus 200 illustrated in FIG. 2. As illustrated in FIG. 2, the apparatus 200 may include a processor 202, a memory 204, an input/output module 206, a communications module 208, a counterfactual management module 210, a prediction management module 212, a model utilization module 214, and a database management module 216. The apparatus 200 may be configured, using one or more of the modules 202-218, to perform the operations described herein.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with example embodiments of the present inventions.

In some embodiments, each of the modules 202-216 may be embodied by a combination of hardware and software for performing the operations described herein. In other embodiments, some of the modules 202-216 may be embodied entirely by hardware. Further, in other embodiments, some of the modules 202-216 may be embodied entirely by software.

The processor 202 may be embodied in a number of different ways and may, for example include one or more processing devices configured to perform independently. Additionally or alternatively, the processor may include one or more processors configured in tandem with a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention when configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206. The input/output module 206 may be configured by hardware means, software means, or a combination thereof. The input/output module 206 that may, in turn, be in communication with processor 202 to provide output to a user interface or display. The user interface may comprise a web user interface, a mobile application, a client device, a terminal, or the like. In some embodiments, the input/output module 206 may also include a keyboard, a mouse, a joystick, a touch screen, touch areas, soft keys, a microphone, a speaker, or other input/output mechanisms. The processor, or user interface circuitry including the processor, may be configured to control one or more functions of one or more user interface elements though computer program instructions (e.g., software and/or firmware) stored on a memory accessible to the processor (e.g., memory 204, onboard memory of the processor, and/or the like).

The communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments the communication interface may additionally or alternatively support wired communication. As such, for example, the communication interface may include a communication modem and/or other hardware/software for supporting communication via cable, digital subscriber line (DSL), universal serial bus (USB), or other mechanisms.

The counterfactual management module 210 may be any means, such as hardware, software, or a combination thereof, to generate a counterfactual incremental electronic currency impact for a target merchant data object and a merchant market identifier. In some embodiments, the counterfactual management module may be configured to generate a counterfactual electronic currency value using a counterfactual model. The counterfactual management module 210 may further be configured to perform one or more operations, algorithms, functions, formulas, or the like to generate or otherwise determine a counterfactual incremental electronic currency impact based on at least the counterfactual electronic currency value generated by the counterfactual model. For example, the counterfactual management module 210 may be configured to identify an actual electronic currency value associated with a particular merchant data object set or merchant market identifier. Additionally or alternatively, the counterfactual management module may include means configured to calculate an adjusted counterfactual incremental electronic currency impact based on the counterfactual incremental electronic currency impact, for example where the adjusted counterfactual incremental electronic currency impact is associated with a second, desired timestamp interval. The counterfactual management module 210 may include means, in some embodiments, for receiving one or more target merchant identifiers, and/or one or more merchant market identifiers or merchant data object sets.

The counterfactual management module 210 may, alternatively or additionally, include means configured to train a counterfactual model. For example, the counterfactual management module 210 may include means for identifying a counterfactual training feature set. Additionally or alternatively, the counterfactual management module 210 may include means configured to identify a counterfactual training market record set, which may be associated with a counterfactual training feature set and a first electronic currency value set. In some embodiments, the counterfactual management module 210 includes means for training a counterfactual model based on the retrieved counterfactual training market record set. Additionally or alternatively, the counterfactual management module 210 may be configured to tune one or more hyperparameters associated with the counterfactual model, for example a record time history threshold.

The prediction management module 212 may be any means, such as hardware, software, or a combination thereof, to manage, maintain, access, and/or otherwise utilize a total predictive model, and/or one or more sub-modules therein. In some embodiments, the prediction manage module 212 may include means configured to receive a predictive input set, where the predictive input set may include at least a merchant market identifier. The prediction management module 212, in some embodiments, additionally or alternatively includes means for generating a predictive electronic currency value using a predictive model. Further, in some embodiments, the prediction management module 212 may include means configured to identify a dependent score set associated with the merchant market identifier and/or target merchant data object (or corresponding identifier). The prediction management module 212 may include means for generating, using an incrementality-trained ensemble model, a predictive incremental electronic currency impact associated with a target merchant data object and merchant market identifier, for example based on at least the predictive electronic currency value generated by the predictive model and the identified dependent score set. Additionally or alternatively, the prediction management module 212 may be configured to tune one or more hyperparameters associated with the predictive model, for example a record time history threshold.

Additionally or alternatively, the prediction management module 212 may include any means to train the models of the total predictive model. In some embodiments, the prediction management module 212 embodies at least means for identifying a predictive training feature set. Additionally or alternatively, the prediction management module 212 may include means for identifying a predictive training market record set associated with the predictive training feature set and a second electronic currency value set. The prediction management module 212 may further include means for training a predictive model based on the predictive training market record set. Additionally or alternatively, the prediction management module 212 may include means to identify an ensemble training record set, which may be associated with an ensemble training feature set. In some embodiments, the prediction management module 212 includes means to train an incrementality-trained ensemble model based on at least the ensemble training record set.

In some embodiments, the counterfactual management module 210 and prediction management module are embodied by a single shared module (e.g., a "Model Management Module"). The model management module may be configured to perform all, or some, of the operations of each module as described. In other embodiments, the counterfactual management module 210 and prediction management module 212 may share various hardware and/or software components to reduce unnecessary component duplication between the modules.

The model utilization module 214 may be any means, such as hardware, software, or a combination thereof, to utilize the predictive incremental electronic currency impact generated by a total predictive model and/or the counterfactual incremental electronic currency impact or the counterfactual electronic currency value generated to perform one or more actions. In some embodiments, the model utilization module 214 includes means to identify or retrieve generated predictive incremental electronic currency impacts associated with various target merchant data objects. Additionally or alternatively, in some embodiments, the model utilization module 214 includes means to generate a target merchant data object ranking list based on the predictive incremental electronic currency impacts for the various target merchant data objects. In some embodiments, the model utilization module 214 further includes means to identify at least one sales user account identifier, each sales user account identifier associated with a sales user account data structure. The model utilization module 214 may include means to assign a target merchant data object to a sales user account data structure. For example, the model utilization module 214 may include means to store the target merchant identifier, which is associated with the top ranked target merchant data object, associated with an identified sales user account identifier. The model utilization module 214 may include means to store at least one target merchant identifier (which may or may not be the top target merchant data object) associated with an identified sales user account identifier based on a corresponding target merchant identifier ranking in the target merchant data object ranking list. In some embodiments, the model utilization module 214 may include means to identify a particular sales account identifier associated with a sales account data structure based on information parsed and/or extracted from the sales account data structure. For example, a top ranked merchant market data object may be stored associated with a sales account identifier for a sales account data structure associated with an experience value that satisfies a particular experience threshold.

Additionally or alternatively, in some embodiments the model utilization module 214 includes any means, including hardware, software, or a combination thereof, to rank one or more models. In some embodiments, the model utilization module 214 may include means to generate, identify, and/or retrieve, or a combination thereof, a plurality of value rank correlation scores, each value rank correlation score associated with a model. For example, in some embodiments, the value rank correlation scores include a first value rank correlation score associated with the total predictive model. The model utilization module 214 may include means to generate a model ranking list based on the plurality of value rank correlation scores. Additionally or alternatively, the model utilization module 214 may include means to identify a top ranked model from the model ranking list based on the plurality of value rank correlation scores. In some embodiments, the model utilization module 214 further includes means to configure at least one device based on the top ranked model.

In some embodiments, the model utilization module 214 may communicate with one or more other modules, for example the counterfactual management module 210 and/or database management module 216, to receive one or more counterfactual incremental electronic currency impacts generated by one or more counterfactual models. Additionally or alternatively, the model utilization module 214 may communicate with one or more other modules, for example prediction management module 212 and/or database management module 216, to receive one or more predictive incremental electronic currency impacts generated by one or more total predictive models or incrementality-trained ensemble models.

In some embodiments, the model utilization module 214 and the counterfactual management module 210 and/or prediction management module 212 are combined, so as to be wholly or substantially embodied by a single module. In other embodiments, the model utilization module 214 and the counterfactual management module 210 and/or prediction management module 212 share hardware and/or software components. Alternatively or additionally, it should be appreciated that the model utilization module 214 may perform one or more operations utilizing one or more other modules, such as the processor 202, memory 204, counterfactual management module 210, prediction management module 212, and the like, or a combination thereof.

The database management module 216 may be any means, such as hardware, software, or a combination thereof, to retrieve information from one or more databases and/or repositories communicable with the apparatus 200. In some embodiments, the database management module 216 includes means for updating information in one or more repositories communicable with the apparatus 200. The database management module 216 may retrieve information for use by the counterfactual management module 210, prediction management module 212, and/or model utilization module 214. For example, the database management may retrieve and/or store market records in a market data repository, merchant data objects in a merchant repository, merchant assignment data objects in a merchant assignment repository, dependent model scores in a dependent model repository, user accounts in a user account repository, or the like. In some embodiments, the database management module 216 is configured to collect merchant and/or market information and store market record(s) based on the collected information.

Other embodiments may include additional and/or alternative modules to those illustrated in FIG. 2. For example, in some embodiments, one or more of the illustrated modules may further include one or more submodules. In other embodiments, the apparatus may include additional modules for performing additional tasks.

Example Operations for Incremental Merchant Value Generation and Evaluation

FIGS. 3-4 illustrate example operations for generating various electronic currency value(s) and/or incremental electronic currency impacts using the various models described above, models in accordance with example embodiments of the present disclosure. It should be appreciated that the illustrated operations may be performed in various orders, and in some embodiments may include alternative or additional operations from those illustrated. The operations illustrated with respect to FIGS. 3-4 are illustrated by way of example, and the scope and spirit of the disclosure is not limited to the specific operations and/or processes depicted. In some embodiments, some or all of the operations illustrated in FIGS. 3-4 may be performed by a merchant-market management system for a computer-implemented process. For example, an embodiment merchant-market management system may be embodied by apparatus 200, and include means for performing the operations described below with respect to the FIGS. 3-4.

FIG. 3 illustrates an example process for generating a counterfactual incremental electronic currency impact and/or adjusted incremental electronic currency impact. The counterfactual electronic currency value(s) generated may be associated with one or more timestamp intervals. In example embodiments, the processes may include one or more optional operations. Optional operations are depicted with broken lines. In some embodiments, the process may be executed by a merchant-market management system, for example a merchant-market management system embodied by an apparatus, such as the apparatus 200.

It should be understood that some or all of the generated values or other information may be stored, for example in one or more databases or repositories. For example, in some embodiments, at least the counterfactual incremental electronic currency impact may be stored, for example associated with a target merchant identifier and merchant market identifier. In such embodiments, the stored information may be retrieved for subsequent use in one or more other models, for example for use by an incrementality-trained ensemble model. Additionally or alternatively, in some embodiments the counterfactual electronic currency value may be stored.

In some embodiments, the process illustrated with respect to FIG. 3 is performed multiple times associated with multiple target merchant identifiers and/or merchant market identifiers. For example, the process may be executed for each merchant data object to be updated as part of an automatic update. In an example embodiment, for example, each counterfactual incremental electronic currency impact for a local merchant data object within a predefined geographic area (e.g., the United States for example) may be updated automatically at a predefined interval (e.g., every week, every day, or the like).

At optional block 302, the apparatus 200 includes means, such as counterfactual management module 210, database management module 216, communications module 208, processor 202, and/or the like, or a combination thereof, for identifying a counterfactual training market record set, where the counterfactual training market record set is associated with a counterfactual training feature set and an electronic currency value set. In some embodiments, each record in the counterfactual training market record set is associated with a particular record timestamp interval. The record timestamp interval embodies signal representations over which the corresponding feature values for each feature were collected. For example, each record may be associated with a particular month defined by a data object representing, including, or otherwise associated with a month start timestamp and a month end timestamp. In other embodiments, the record timestamp interval may be associated with another time period, such as where each record is associated with a week defined by a data object representing, including, or otherwise associated with a week start timestamp and a week end timestamp. It should be appreciated that a record timestamp interval may be defined by a data object representing, including, or otherwise associated with any start timestamp and end timestamp, and that the timestamps need not define a time interval well-defined by human constructs (e.g., days, week, months, years, or other easily contemplated time intervals).

In some embodiments, the counterfactual training market record set comprises, or otherwise is associated with, a counterfactual training feature set. The counterfactual training feature set defines one or more data features to be considered by the model, and for which the model will be trained. In some embodiments, the counterfactual training feature set may be defined by the features described with regard to Table 1. In other embodiments, the counterfactual training feature set may be defined by a subset of features present in Table 1. The counterfactual training feature set may include one or more features used by a descriptive model.

The counterfactual training market record set may include one or more market records. Each market record in the set may include, at least, a feature value for the features defined by the counterfactual training feature set. For example, the counterfactual training feature set may include, in some embodiments, all or a subset of the features defined by Table 1 above. Additionally or alternatively, in some embodiments, additional, alternative, or derivative features may be included. In some embodiments, the counterfactual feature set includes a subset of the available features for the counterfactual training market record set. The counterfactual training market record set, in some embodiments, further comprises an electronic currency value set. In some embodiments, the electronic currency value set comprises a particular feature value for a particular feature from each record the counterfactual training market record set. In other embodiments, the electronic currency value set represents a second data set separate from the remainder of the counterfactual training market record set, where each record in the remainder of the counterfactual training market record set is associated with a record in the electronic currency value set.

In some embodiments, the counterfactual training market record set is retrieved from one database and/or repository. In some such embodiments, the database and/or repository may be configured to form the counterfactual training market record set from one or more linked and/or sub-repositories. In other embodiments, the counterfactual training market record set is retrieved from two or more databases and/or other repositories. For example, whether retrieved from one or several databases and/or repositories, a counterfactual training market record set may be retrieved in response to one or more queries performed based on one or more merchant market identifiers.

At optional block 304, the apparatus 200 includes means, such as counterfactual management module 210, database management module 216, communications module 208, processor 202, and/or the like, or a combination thereof, for training a counterfactual model based on the counterfactual training market record set. The counterfactual model may be a descriptive model for estimating a counterfactual electronic currency value. For example, the counterfactual electronic currency value may represent the removal the estimated electronic currency value associated with a merchant market identifier where a target merchant data object is removed, or otherwise not included in the merchant data object set associated with, or defined by, the merchant market identifier. For example, for a total merchant data object set comprising one or more target merchant data object(s) and a remaining merchant data object set, the counterfactual electronic currency value may generate an estimated electronic currency value had the total merchant data object set comprised only the remaining merchant data object set (in other words, without the target merchant data object(s)).

In other embodiments, the counterfactual model may be received, retrieved, or otherwise pre-trained such that training by the apparatus 200 is not required. For example, the counterfactual model may be trained and accessible via a third-party server or system, for example using one or more APIs. Additionally or alternatively, the counterfactual model may be trained by a third-party system or server and loaded, or otherwise installed, to the apparatus 200 for execution. It should be understood that the counterfactual model may be made available to the apparatus 200 in various other ways, via the components of apparatus 200 and/or in conjunction with communication with one or more third-party systems or servers.

The counterfactual model may comprise one or more algorithmic and/or machine learning models. For example, in some embodiments, the counterfactual model may comprise a linear mixture model. The counterfactual model may be trained to generate the counterfactual electronic currency value based on a counterfactual input set. The counterfactual input set is described further below.

At block 306, the apparatus 200 includes means, such as counterfactual management module 210, database management module 216, communications module 208, processor 202, and/or the like, or a combination thereof, for identifying a first observed market record set, the first observed market record set associated with a total merchant data object set. The total merchant data object set comprises a target merchant data object and a remaining merchant data object set. The counterfactual electronic currency value to be generated associated with the remaining merchant data set, or in other words is to be generated with the target merchant data object removed from the total merchant data object set. In some embodiments, the total merchant data object set is associated with a merchant market identifier. The target merchant data object may be selected automatically by the apparatus 200. For example, in some embodiments, the target merchant identifier may be selected by the apparatus 200, or an associated system, automatically as part of an automated updating process. The apparatus 200 may cycle through a particular set of merchant data objects and select each as target merchant data object associated with one or more associated merchant market identifiers. In other embodiments, the target merchant identifier may be input by a user.

In some embodiments, the apparatus 200 includes means, such as counterfactual management module 210, database management module 216, input/output module 206, communications module 208, processor 202, and/or the like, or a combination thereof, for receiving the merchant market identifier. In some embodiments the merchant market identifier may be input, or selected from a group of merchant market identifiers, by a user. The merchant market identifier may be associated with, or otherwise linked to, one or more merchant data objects, or a merchant market data object associated with one or more merchant data objects. For example, in some embodiments, a database or repository may be queried based on the received merchant market identifier, and may receive the total merchant data object set in response.

At block 308, the apparatus 200 includes means, such as counterfactual management module 210, database management module 216, communications module 208, processor 202, and/or the like, or a combination thereof, for identifying a second market record set, the second market record set associated with the target merchant data object. In some embodiments, the second market record set is associated with only the target merchant data object.

In some embodiments, the apparatus 200 includes means, such as counterfactual management module 210, database management module 216, input/output module 206, communications module 208, processor 202, and/or the like, or a combination thereof, for receiving the target merchant identifier associated with the target merchant data object. In some embodiments, a user may select the target merchant data object, or the target merchant identifier associated with the target merchant data object via an interface. For example, a user may select the target merchant data object from the total merchant data object set.

The first observed market record set and/or second observed market record set may be identified based on a retrieved market record set. The retrieved market record set may be associated with a particular merchant market identifier and/or total merchant data object set. Each market record in the retrieved market record set may be associated with one or more merchant data objects of the total merchant data object set. For example, the market record set may include one or more market records associated with the target merchant data object. Each record may be associated with a timestamp interval defining an observed period associated with the record. For example, each market record may be associated with a month, week, or other timestamp interval that represents an observed period.

At block 310, the apparatus 200 includes means, such as counterfactual management module 210, database management module 216, communications module 208, processor 202, and/or the like, or a combination thereof, for determining a counterfactual input feature set based on the first observed market record set and the second observed market record set, the counterfactual market record set associated with the remaining merchant data object set. In some embodiments, the counterfactual input feature set is calculated based on the difference between the first observed market record set and the second observed market record set. In other words, the counterfactual input feature set may represent the second observed market record set removed from the first observed market record set, such that the counterfactual input feature set is associated with the remaining merchant data object set.

In some embodiments, the counterfactual input feature set comprises at least a merchant market identifier, a live merchant count indicator, a service header identifier or shared market identifier, a total number of merchant days having available, featured, and transactions. The counterfactual input feature set may be embodied by a particular market record. Alternatively or additionally, the counterfactual input feature set may comprise user input values, for example input via an interface.

At block 312, the apparatus 200 includes means, such as counterfactual management module 210, database management module 216, communications module 208, processor 202, and/or the like, or a combination thereof, for generating, using a counterfactual model, a counterfactual electronic currency value associated with the remaining merchant data object set based on the counterfactual record set. The counterfactual electronic currency value may be associated with the remaining merchant data object set. Additionally, in some embodiments, the counterfactual electronic currency value may be associated with a record timestamp interval. For example, the record timestamp interval may represent a calendar month. The counterfactual electronic currency value may represent an estimated electronic currency value generated by the remaining merchant data objects (e.g., without the target merchant data object(s)).

The counterfactual model may be one or more trained algorithmic and/or machine learning models. In an example embodiment, the counterfactual model may be a trained linear mixture model. In some such embodiments, each input in the counterfactual input feature set may be associated with distinct parameters and/or weights. For example, categorical inputs may be associated with a first input weight, or a first input weight set, and numerical inputs may be associated with a second weight, or a second input weight set.

At block 314, the apparatus 200 includes means, such as counterfactual management module 210, database management module 216, communications module 208, processor 202, and/or the like, or a combination thereof, for identifying an actual electronic currency value associated with the total merchant data object set. In some embodiments, the actual electronic currency value may be retrieved associated with the record timestamp interval. For example, the electronic currency value may represent the actual generated electronic currency value associated with the total merchant data object set during the record timestamp interval (e.g., over a previous month).

In some embodiments, the actual electronic currency value may be retrieved from a database and/or repository. In other embodiments, the actual electronic currency value may be identified by one or more calculations. In some such embodiments, a market record set may be retrieved from one or more repositories or databases, and the actual electronic currency value calculated based on the market record set. For example, an electronic currency value feature of each market record in the set may be summed to calculate, or otherwise identify, the actual electronic currency value.

At block 316, the apparatus 200 includes means, such as counterfactual management module 210, database management module 216, communications module 208, processor 202, and/or the like, or a combination thereof, for determining a counterfactual incremental electronic currency impact associated with the target merchant data object. The counterfactual incremental electronic currency impact is based on the actual electronic currency value and the counterfactual electronic currency value. In some embodiments, the counterfactual incremental electronic currency impact is calculated by taking the difference between the actual electronic currency value and the counterfactual electronic currency value.

The counterfactual incremental electronic currency impact may be associated with the target merchant data object and associated with the record timestamp interval. For example, the counterfactual incremental electronic currency impact may represent the electronic currency value generated by addition of the target merchant data object to the total merchant data object set. Additionally or alternatively, the counterfactual incremental electronic currency impact may be associated with the record timestamp interval (e.g., a particular calendar month). The counterfactual incremental electronic currency impact may be stored associated with the target merchant data object and/or record timestamp interval.

In some embodiments, multiple counterfactual incremental electronic currency impacts may be generated for a target merchant data object, each associated with a different record timestamp interval. For example, a counterfactual incremental electronic currency impact may be generated for two or more calendar months, such as a current month and a previous month, or a current month and a subsequent month. In some such embodiments, each counterfactual incremental electronic currency impact may be stored associated with a corresponding record timestamp interval and target merchant data object. For example, one or more records may be stored to a database and/or repository, where the one or more records are retrievable using the target merchant identifier associated with the target merchant data object and/or record timestamp interval.

At optional block 318, the apparatus 200 includes means, such as counterfactual management module 210, database management module 216, communications module 208, processor 202, and/or the like, or a combination thereof, for calculating an adjusted counterfactual incremental electronic currency impact. In some embodiments, the adjusted counterfactual incremental electronic currency impact may be associated with a second timestamp interval. The second timestamp interval may be defined by a start timestamp and an end timestamp. For example, the second timestamp interval may represent the subsequent 30 days from a current timestamp. In this regard, the second timestamp interval may represent a time interval spanning two or more record timestamp intervals. For example, the second timestamp interval may span two or more calendar months (in other words, the start timestamp falls in a first calendar month and the end timestamp interval falls in a second, different calendar month).

In some embodiments, the adjusted counterfactual incremental electronic currency impact is calculated using a weighted average calculation. For example where each record timestamp interval is a calendar month, the number of days spanned in each calendar month by the second timestamp interval, based on the start timestamp interval and the end timestamp interval, may represent a weight set for calculating the adjusted counterfactual incremental electronic currency impact. The weight set may then be used to calculate a weighted counterfactual incremental electronic currency impact for each record timestamp interval based on the counterfactual electronic currency value associated with that record timestamp interval. In a particular example, the start timestamp falls in a first calendar month having 30 days total and two days remaining after the start timestamp to the end of the month, where the first calendar month is associated with a first counterfactual electronic currency value, and the end timestamp falls in a second calendar month having 30 days total and 28 days from the beginning of the month until the end timestamp, where the second calendar month is associated with a second counterfactual electronic currency value. The adjusted incremental counterfactual electronic currency value may be calculated based on the ratio of the remaining days in the first month multiplied by the counterfactual electronic currency value for the first calendar month (e.g., 2/30*first counterfactual electronic currency value) added to the ratio of the remaining days in the second month multiplied by the counterfactual electronic currency value for the second calendar month (e.g., 28/30*second counterfactual electronic currency value). In other examples, the second timestamp interval may span one or more intermediate months (e.g., where the start timestamp falls in a first month, and the end timestamp falls in a second month not continuous with the first month). The intermediate month may affect the adjusted counterfactual incremental electronic currency impact by adding the counterfactual electronic currency value associated with the intermediate month.

In some embodiments, the apparatus 200 may generate an adjusted counterfactual incremental electronic currency impact for various target merchant data objects and/or various merchant market identifiers, and/or store the adjusted counterfactual incremental electronic currency impact(s). Generated adjusted counterfactual incremental electronic currency impact(s) may be stored, for example in a database or repository, associated with the corresponding second timestamp interval, target merchant data object, and/or merchant market identifier. For example, in some embodiments, the apparatus 200 may update the adjusted counterfactual incremental electronic currency impact for one or more target merchant data objects at one or more predefined time interval(s), for example daily, weekly, monthly, or the like).

FIG. 4 illustrates an example process for generating a predictive incremental electronic currency impact using one or more predictive models. The predictive incremental electronic currency impact(s) may be associated with one or more timestamp intervals. In example embodiments, the processes may include one or more optional operations. Optional operations are depicted with broken lines. In some embodiments, the process may be executed by a merchant-market management system, for example a merchant-market management system embodied by an apparatus, such as the apparatus 200.

It should be understood that some or all of the generated values or other information may be stored, for example in one or more databases or repositories. For example, in some embodiments, at least the predictive electronic currency value may be stored, for example associated with a target merchant identifier and merchant market identifier. Additionally or alternatively, the predictive incremental electronic currency impact may be stored. In some embodiments, the stored information may be retrieved for later utilization, for example for one or more of the actions described below with respect to FIGS. 6 and 7.

In some embodiments, the process illustrated with respect to FIG. 4 is performed multiple times associated with multiple target merchant identifiers and/or merchant market identifiers. For example, the process may be executed for each merchant data object to be updated as part of an automatic update. In an example embodiment, for example, each counterfactual incremental electronic currency impact for a local merchant data object within a predefined geographic area (e.g., the United States for example) may be updated automatically at a predefined interval (e.g., every week, every day, or the like).

At optional block 402, the apparatus 200 includes means, such as counterfactual management module 210, database management module 216, communications module 208, processor 202, and/or the like, or a combination thereof, for identifying a predictive training market record set, the predictive training market record set associated with a predictive training feature set and a second electronic currency value set. In some embodiments, each record in the predictive training market record set is associated with a particular record timestamp interval. The record timestamp interval embodies signal representations over which the corresponding feature values for each feature were collected. For example, each record may be associated with a particular month defined by a data object representing, including, or otherwise associated with a month start timestamp and a month end timestamp. In other embodiments, the record timestamp interval may be associated with another time period, such as where each record is associated with a week defined by a data object representing, including, or otherwise associated with a week start timestamp and a week end timestamp. It should be appreciated that a record timestamp interval may be defined by a data object representing, including, or otherwise associated with any start timestamp and end timestamp, and that the timestamps need not define a time interval well-defined by human constructs (e.g., days, week, months, years, or other easily contemplated time intervals). In some embodiments, the record timestamp interval associated with the predictive training market record set may be the same as the record timestamp interval associated with the counterfactual training market record set. Alternatively or additionally, the predictive training market record set may be the same as the counterfactual training market record set.

In some embodiments, the predictive training market record set comprises, or otherwise is associated with, a predictive training feature set. The predictive training feature set defines one or more data features to be considered by the predictive model, and for which the model will be trained. In some embodiments, the predictive training feature set may be defined by the features described with regard to Table 1. In other embodiments, the predictive training feature set may be defined by a subset of features present in Table 1. For example, the predictive training feature set may include one or more features used by a predictive model, such as only a particular subset of features suitable for predictive value generation. In some embodiments, the predictive training feature set may define a subset of the counterfactual training feature set.

The predictive training market record set may include one or more market records. Each market record in the predictive training market record set may include, at least, a feature value for the features defined by the predictive training feature set. For example, the predictive training feature set may include, in some embodiments, all or a subset of the features defined by Table 1 above. Additionally or alternatively, in some embodiments, additional, alternative, or derivative features may be included. In some embodiments, the predictive feature set includes a subset of the available features for the predictive training market record set. The predictive training market record set, in some embodiments, further comprises a second electronic currency value set. In some embodiments, the second electronic currency value set comprises a particular feature value for a particular feature from each record the counterfactual training market record set. In other embodiments, the second electronic currency value set represents third data set separate from the remainder of the predictive training market record set, where each record in the remainder of the predictive training market record set is associated with a record in the third electronic currency value set.

In some embodiments, the predictive training market record set is retrieved from one database and/or repository. In some such embodiments, the database and/or repository may be configured to form the predictive training market record set from one or more linked and/or sub-repositories. In other embodiments, the predictive training market record set is retrieved from two or more databases and/or other repositories. For example, whether retrieved from one or several databases and/or repositories, a predictive training market record set may be retrieved in response to one or more queries performed based on one or more merchant market identifiers. In some embodiments, the predictive training market record set may have been previously received or retrieved, for example where the predictive training market record set comprises the counterfactual training market record set associated with the predictive training feature set and the second electronic currency value set.

At optional block 404, the apparatus 200 includes means, such as counterfactual management module 210, database management module 216, communications module 208, processor 202, and/or the like, or a combination thereof, for training a predictive model based on the predictive training market record set. The predictive model may be a predictive machine learning model, algorithmic model, statistical model, and/or the like, or a combination thereof, for predicting a predictive electronic currency value associated with a merchant market identifier, or a particular merchant data object set (or subset thereof) associated with the merchant market identifier.

In other embodiments, the predictive model may be received, retrieved, or otherwise pre-trained such that training by the apparatus 200 is not required. For example, the predictive model may be trained and accessible via a third-party server or system, for example using one or more APIs. Additionally or alternatively, the predictive model may be trained by a third-party system or server and loaded, or otherwise installed, to the apparatus 200 for execution. It should be understood that the predictive model may be made available to the apparatus 200 in various other ways, via the components of apparatus 200 and/or in conjunction with communication with one or more third-party systems or servers.

At block 406, the apparatus 200 includes means, such as prediction management module 212, database management module 216, input/output module 206, communications module 208, processor 202, and/or the like, or a combination thereof, for receiving a predictive input feature set. In some embodiments, at least a portion of the predictive input feature set may be received by a client device in communication with the apparatus 200, and a second portion of the predictive input feature set may be retrieved based on the inputs from the client device. For example, a user may input, via a client device, a merchant market identifier the predictive input feature set may be received by a client device in communication with the apparatus 200. In an example embodiment, the predictive input feature set may include a merchant market identifier, a number of merchant data objects associated with the merchant market identifier that are associated with at least one live deal data object, a service header identifier, and a timestamp interval. In some embodiments, one or more of the predictive input features are automatically received and/or otherwise determined by the apparatus 200, or an associated system. For example, the predictive input set may be received automatically based on a merchant data object identified as requiring updating or being updated as part of an automatic update schedule. In other embodiments, at least a portion of the predictive input set is received from a client device. In some embodiments, the predictive input feature set may be embodied by a particular market record.

At block 408, the apparatus 200 includes means, such as predictive management module 212, database management module 216, communications module 208, processor 202, and/or the like, or a combination thereof, for generating, using a predictive model, a predictive electronic currency value associated with a merchant market identifier. The predictive model may be one or more algorithms, machine learning models, or a combination thereof. In some embodiments, the predictive model may generate the predictive electronic currency value based on the received predictive input feature set. For example, in some embodiments, the predictive model may be embodied by a linear mixture model.

In some embodiments, the predictive model is trained by the apparatus 200 at an earlier block. For example, the apparatus 200 or an associated sub-system, may be configured to train the predictive model at block 404. In other embodiments, the apparatus 200 retrieves, accesses, or otherwise utilizes a predictive model trained by and/or accessible through another system or device. For example, the apparatus 200 may utilize the predictive model via communications with a third-party server or device. The apparatus 200 may communicate with the one or more systems or devices via one or more application programming interfaces (APIs).

The predictive electronic currency value may be associated with a merchant market identifier, for example the merchant market identifier included in the predictive input set. In a particular example, the predictive electronic currency value may represent a predicted gross electronic currency value associated with the merchants embodied by the merchant data objects associated with the merchant market identifier over the time period embodied by the input timestamp interval. For example, the predictive electronic currency value may represent the predicted electronic currency value generated by all merchant data objects associated with a particular market represented by the merchant market identifier over a particular month.

At block 410, the apparatus 200 includes means, such predictive management module 212, database management module 216, communications module 208, processor 202, and/or the like, or a combination thereof, for identifying a dependent score set. In some embodiments, the dependent score set may include one or more dependent score(s) associated with the target merchant data object and/or input merchant market identifier. In an example embodiment, the dependent score(s) may be generated by a second model. For example, the dependent score may represent a second predictive electronic currency value associated with the target merchant data object.

In some embodiments, the dependent score set is retrieved from one or more databases and/or repositories. For example, the dependent score set may be stored associated with the target merchant identifier, target merchant data object, and/or merchant market identifier. Additionally, the dependent score set may be stored and retrieved associated with a record timestamp interval. In some embodiments, the apparatus 200, and/or an associated system, is configured to generate one or more dependent scores using the dependent model, and/or cause updates of the dependent score(s). For example, the dependent scores may be updated, by the apparatus 200 and/or a related system, at a predetermined interval (e.g., daily, weekly, monthly, or the like).

At optional block 412, the apparatus 200 includes means, such as counterfactual management module 210, database management module 216, communications module 208, processor 202, and/or the like, or a combination thereof, for identifying an ensemble training record set, the ensemble training record set associated with an ensemble training feature set. In some embodiments, the ensemble training feature set includes at least an adjusted counterfactual incremental electronic currency impact. The ensemble training record set may include at least one or more records, each record including an adjusted counterfactual incremental electronic currency impacts associated with a target merchant identifier and a merchant market identifier. Each record also may include, or is otherwise associated with, a dependent score and/or predictive electronic currency value for the merchant market identifier. For example, in some embodiments, the dependent score set and one or more predictive electronic currency values forming a predictive electronic currency value set may be joined. The adjusted counterfactual incremental electronic currency impact for a record may represent a target value for training the incrementality-trained ensemble model.

At optional block 414, the apparatus 200 includes means, such as counterfactual management module 210, database management module 216, communications module 208, processor 202, and/or the like, or a combination thereof, for training an incrementality-trained ensemble model based on the ensemble training record set. The incrementality-trained ensemble model may be trained, using the ensemble training record set, to generate and output a predictive incremental electronic currency impact that best tracks the incremental counterfactual electronic currency value based on the dependent score and predictive electronic currency value for the target merchant identifier and/or target merchant identifier.

It should be appreciated that, in some embodiments, the incrementality-trained ensemble model may be previously trained or trained via a third-party server or system. For example, a trained incrementality-trained ensemble model may be accessible with one or more APIs for accessing a third-party server or system. In other embodiments, the incrementality-trained ensemble model may be previously or externally trained and loaded and/or installed to the apparatus 200.

At block 416, the apparatus 200 includes means, such as counterfactual management module 210, database management module 216, communications module 208, processor 202, and/or the like, or a combination thereof, for generating, using an incrementality-trained ensemble model, a predictive incremental electronic currency impact based on the predictive electronic currency value and the dependent score set. In some embodiments, the predictive incremental electronic currency impact associated with a target merchant identifier and/or merchant market identifier may be generated based on the predictive electronic currency value for the target merchant identifier and/or the merchant market identifier, and the dependent score associated with the target merchant identifier and/or merchant market identifier.

It should be appreciated that the predictive incremental electronic currency impact may be associated with a different timestamp interval than the ensemble training record set, dependent score set, and/or dependent score set. For example, one or more of the above sets may be associated with a first record timestamp interval (e.g., a monthly timestamp interval). The predictive incremental electronic currency impact may, in at least one example embodiment for example, be associated with a second timestamp interval associated with a daily time period.

In some embodiments, the incrementality-trained ensemble model generates the predictive incremental electronic currency impact by performing one or more statistical analyses, algorithms, or the like, based on at least the dependent score for a target merchant identifier and/or merchant market identifier and predictive electronic currency value associated with the target merchant identifier and/or merchant market identifier. For example, in an example embodiment, the incrementality-trained ensemble model comprises an ensemble learning model. In some embodiments, the ensemble learning model comprises one, or multiple, ensemble machine learning models. In other embodiments, the ensemble learning model comprises at least one algorithmic and/or statistical model. In other embodiments still, the ensemble learning model comprises a combination thereof.

Example Operations Merchant Market Data Set Retrieval

FIG. 5 illustrates example operations for retrieving an appropriate market record set for training and/or utilizing a counterfactual model or predictive model based on a record time horizon threshold, in accordance with some example embodiments of the present disclosure. In some embodiments, when training a predictive model and/or a counterfactual model, a record time horizon threshold may be tuned to address problems with data sparsity and maintain generalizability. For example, in some embodiments, the counterfactual training market record set and/or predictive training market record set includes a subset of market records associated with a particular merchant market identifier, and the particular merchant market identifier and/or subset of market records may be identified based on the record time horizon threshold as described herein. In some embodiments, the operations illustrated in FIG. 5 are performed by a merchant-market management system during training of a counterfactual model and/or predictive model. The operations of FIG. 5, for example, may be performed by a merchant-market management system embodied by the apparatus 200.

At block 502, the apparatus 200 includes means, such as communications module 208, input/output module 206, processor 202, and/or the like, to identify a record time horizon threshold. The record time horizon threshold may be tuned, or in the process of being tuned, associated with a predictive model or counterfactual model. In an example embodiment, an identified record time horizon threshold satisfies an acceptable error range (e.g., the record time horizon threshold is associated with a value error within the acceptable error range) and a generalizability threshold (e.g., the record time horizon threshold satisfies the generalizability threshold). For example, in some embodiments the acceptable error range may be input by a user, or identified based on a pre-determined setting and/or configuration, during training of the predictive and/or counterfactual model.

Many record time horizon thresholds may be tested during training of a predictive and/or counterfactual model(s). Each record time horizon threshold may be associated with a corresponding value error, which may represent an error associated with the values generated by the model. For example, various tested record time horizon thresholds and value errors are summarized in Table 3. In some embodiments, the record time horizon threshold is set to minimize the value errors associated with the predictive and/or counterfactual model (for example, record time horizon threshold 0 in Table 3). Alternatively, in some embodiments, the record time horizon threshold is set to enable better generalizability while maintaining a value error within an acceptable error range. For example, again referring to Table 3 as a particular example, if an acceptable error range of 0.000 to 2.100 (or in other words, less than 2.100), the record time horizon threshold may be set to 5 months to better enable data generalizability. A user may set a record time horizon threshold associated with each model that best fits their desired accuracy and generalizability.

TABLE 3

Exemplary Record Time Horizon Threshold Test Summary

| Record Time Horizon Threshold (Months) | Value Error (RMSE) |
|---|---|
| 0 | 2.010 |
| 5 | 2.048 |
| 10 | 2.100 |
| 15 | 2.309 |
| 20 | 2.192 |
| 50 | 3.307 |

The record time horizon threshold may correspond to a minimum number of market records that a market record set associated with a market identifier must have. If a market record set for a particular merchant market identifier does not have sufficient records to satisfy the record time horizon threshold, then the merchant market identifier may be considered associated with too new a market to be considered useful in performing accurate predictions based only on the market data records for the merchant market identifier.

At block 504, the apparatus 200 includes means, such as prediction management module 212, counterfactual management module 210, communications module 208, processor 202, and/or the like, to query for a market record set based on a primary merchant market identifier. The primary merchant market identifier may have been received at an earlier stage, for example the apparatus 200 may be configured to automatically cycle through each merchant market identifier during training to identify a corresponding market record set.

At decision block 506, the apparatus includes means, such as prediction management module 212, counterfactual management module 210, communications module 208, processor 202, and/or the like, to determine if the market record set associated with the primary merchant market identifier satisfies the record time horizon value. The apparatus may query a market data repository for a market record set based on the primary merchant market identifier, and receive the market record set as response data. In some embodiments, the market record set associated with the primary merchant market identifier satisfies the record time horizon value when the number of market records in the retrieved market record set for the primary merchant market identifier equals or exceeds the record time horizon threshold.

For example, in an example embodiment, the market record set may include monthly records associated with the primary merchant market identifier. If the record time horizon threshold is 0, the market record set would be guaranteed to satisfy the record time horizon threshold (as each market record set associated with each merchant market identifier would be guaranteed to have 0 or more market records). However, if the record time horizon threshold is 5, the market record set must include at least 5 market records. If sufficient data has not been collected associated with the primary merchant market identifier, the market record set may not include sufficient records to satisfy the record time horizon threshold. For example, if the merchant market identifier represents a newly established merchant market identifier, and each market record corresponds to a monthly timestamp interval, then the market record set may not satisfy the record time horizon threshold if too few market records are available to be accurately used.

If, at decision block 506, the market record set associated with the primary merchant market identifier is determined to satisfy the record time horizon threshold, flow continues to block 508. At block 508, the apparatus 200 includes means, such as prediction management module 212, counterfactual management module 210, communications module 208, processor 202, and/or the like, to retrieve the market record set associated with the primary merchant market identifier. For example, in some embodiments, the apparatus receives the market record set associated with the primary merchant market identifier as response data. The market record set associated with the primary merchant market identifier may subsequently be included and/or otherwise used in a counterfactual training market record set and/or predictive training market record set when training a predictive model and/or counterfactual model.

Alternatively if, at decision block 506, the market record set associated with the primary merchant market identifier is determined to not satisfy the record time horizon threshold, flow continues to block 510. At block 510, the apparatus 200 includes means, such as prediction management module 212, counterfactual management module 210, communications module 208, processor 202, and/or the like, to identify a shared merchant market identifier associated with the primary merchant market identifier. In some embodiments, the primary merchant market identifier may comprise, or otherwise be associated with, a service identifier associated with a particular service. The primary merchant market identifier may be associated with a first merchant data record set. Additionally or alternatively, the service identifier may be associated with a particular service header identifier that functions as a higher-level categorization of the merchant data objects. For example, a single service header identifier may be associated with multiple various service identifiers. The shared merchant market identifier may include the service header identifier, which is similarly associated with a second market record set. The market record set associated with the shared merchant market identifier may be associated with various merchant market identifiers, including the primary merchant market identifier.

At block 512, the apparatus 200 includes means, such as prediction management module 212, counterfactual management module 210, communications module 208, processor 202, and/or the like, to retrieve a shared market record set associated with the shared merchant market identifier. The shared market record set may comprise one or more market records associated with the shared merchant identifier. In other embodiments, the apparatus retrieves the shared market record set by performing an updated query of a market data repository based on the shared merchant market identifier, and receiving the shared market record set as response data to the updated query.

The shared market record set corresponds to market records that are associated with a shared merchant market identifier that linked, or otherwise associated with, the primary merchant market identifier. In some embodiments, the process illustrated with regard to blocks 504-512 may be repeated for various primary merchant market identifiers. For example, in some embodiments, an identified counterfactual training market record set includes a subset of market records associated with each possible primary merchant market identifier, or a subset thereof, where the corresponding subset of market records may be a shared market record set associated with the shared market identifier when the market record set associated with the primary merchant market identifier does not satisfy the record time horizon threshold.

The shared market record set may thus provide sufficient data for use in identifying a counterfactual training market record set and/or a predictive training market record set including sufficient market records for each merchant market identifier such that the corresponding model will be trained with sufficient accuracy and generalizability. Thus, using a shared market record set addresses problems associated with data scarcity and enables generation of a predictive incremental electronic currency impact with increased accuracy in circumstances of data scarcity.

Example Process for Assigning Ranked Merchant Data Objects to Users

Generated counterfactual incremental electronic currency impact(s) and/or predictive incremental electronic currency impacts may be analyzed, evaluated, and/or utilized in various manners. FIG. 6, for example, illustrates an example process for ranking merchant data objects and assigning ranked merchant data objects to a sales user account data structure, in accordance with example embodiments of the present disclosure. In example embodiments, the processes may include one or more optional operations. Optional operations are depicted with broken lines. In some embodiments, the process may be executed by a merchant-market management system, for example a merchant-market management system embodied by an apparatus, such as the apparatus 200.

At block 602, the apparatus 200 includes means, such as prediction management module 212, database management module 216, communications module 208, processor 202, and/or the like, or a combination thereof, for generating a first predictive incremental electronic currency impact associated with a first target merchant identifier and a merchant market identifier. The first predictive incremental electronic currency impact may be generated as described above, for example via the process depicted and described with respect to FIG. 4 above. In other embodiments, the first predictive incremental electronic currency impact may be retrieved, for example from a database or repository. In such embodiments, the apparatus 200 may not have generated the first predictive incremental electronic currency impact, or may have generated the first predictive incremental electronic currency impact and stored it.

At block 604, the apparatus 200 includes means, such as prediction management module 212, database management module 216, communications module 208, processor 202, and/or the like, or a combination thereof, for generating a second predictive incremental electronic currency impact associated with a second target merchant identifier and the merchant market identifier. Like the first predictive incremental electronic currency impact, the second predictive incremental electronic currency impact may be generated as described above, for example via the process depicted and described with respect to FIG. 4 above. Similarly, in other embodiments, the second predictive incremental electronic currency impact may be retrieved, for example from a database or repository. In such embodiments, the apparatus 200 may not have generated the second predictive incremental electronic currency impact, or may have generated the second predictive incremental electronic currency impact and stored it.

At optional block 606, the apparatus 200 includes means, such as prediction management module 212, database management module 216, communications module 208, processor 202, and/or the like, or a combination thereof, for generating at least one additional predictive incremental electronic currency impact associated with at least one additional target merchant identifier and the merchant market identifier. In some embodiments, an additional predictive incremental electronic currency impact is generated for each additional target merchant identifier associated with a target merchant data object in an additional target merchant data object set. For example, a predictive incremental electronic currency impact may be generated for one or more new merchant data objects under consideration for including as associated with a particular merchant market identifier. Each additional predictive incremental electronic currency impact may be generated as described above, for example via the process depicted and described with respect to FIG. 4 above. In other embodiments, each additional predictive incremental electronic currency impact may be retrieved, for example from a database or repository. In such embodiments, the apparatus 200 may not have generated all, or a portion, of the additional predictive incremental electronic currency impact(s), or may have generated one or more of the additional predictive incremental electronic currency impact and stored each generated additional predictive incremental electronic currency impact.

In some embodiments, the statistical, algorithmic, or machine learning model used to generate the first, second, and/or one or more additional predictive incremental electronic currency impacts is chosen by the apparatus 200 based on a model ranking list associated with a set of models. The set of models may include the incrementality-trained ensemble model, dependent model, and/or one or more other models for generating a predictive incremental electronic currency impact. For example, in some embodiments, the apparatus 200 is configured to use a highest ranking model from the model ranking list. In other embodiments, each model in the model ranking list is assigned a probability based on the respective ranking for each model, and the apparatus 200 chooses a predictive model based on the probabilities. For example, in some embodiments, the apparatus 200 chooses a model randomly based on the probabilities. In other embodiments, each model in a model set is associated with the same probability, such that the apparatus 200 has an equal chance to choose any of the model. In other embodiments, the incrementality-trained ensemble model is used to generate each predictive incremental electronic currency impact.

At block 608, the apparatus 200 includes means, such as model utilization module 214, communications module 208, processor 202, and/or the like, or a combination thereof, for generating a target merchant data object ranking list based on at least the first predictive incremental electronic currency impact and the second predictive incremental electronic currency impact. In some embodiments, the target merchant data object ranking list is generated further based on the at least one additional predictive incremental electronic currency impact(s). The target merchant data object ranking list includes at least one target merchant identifier ranking. Each target merchant identifier ranking is associated with a corresponding target merchant identifier.

In some embodiments, the target merchant data object ranking list is generated based on a comparison between the first predictive incremental electronic currency impact, second predictive incremental electronic currency impact, and any additional predictive incremental electronic currency impact. The target merchant data object ranking list may rank each target merchant identifier based on the corresponding predictive incremental electronic currency impact. For example, the target merchant data object ranking list may include a top target merchant data object ranking associated with the target merchant identifier associated with the greatest value predictive incremental electronic currency impact. The target merchant data object ranking list may further include target merchant identifier rankings for each subsequent target merchant identifiers in order of descending predictive incremental electronic currency impacts. It should be appreciated that, in other embodiments, other algorithms and/or formulas may be utilized for ranking, and the top merchant identifier may be associated with a high numerical value in some embodiments and a low numerical value in other embodiments.

At block 610, the apparatus 200 includes means, such as model utilization module 214, communications module 208, processor 202, and/or the like, or a combination thereof, for identifying at least one sales user account identifier. Each sales user account identifier may be associated with a sales user account data structure. The sales user account data structure may be assigned management of a merchant data object by storing a corresponding merchant identifier associated with the sales user account data structure or associated identifier.

In some embodiments, one or more sales user account identifiers is/are identified based on the target merchant data object ranking list. For example, in some embodiments, each sales user account identifier associated with a sales user account data structure may be identified. To identify existing sales user account identifiers, in some embodiments, the apparatus 200 may query a database and/or repository, for example a user account repository, and receive such user accounts as response data.

At block 612, the apparatus 200 includes means, such as model utilization module 214, database management module 216, communications module 208, processor 202, and/or the like, or a combination thereof, for storing at least one of the first target merchant identifier, the second target merchant identifier, or one or more of the at least one additional target merchant identifiers associated with an identified sales user account identifier based on a corresponding target merchant identifier ranking. For example, in some embodiments to efficiently allocate merchant data objects and corresponding resources for managing the merchant data objects, the target merchant identifier associated with the top ranked target merchant data object is stored associated with an identified sales user account identifier that is associated with merchant data objects totaling the lowest predictive incremental electronic currency impacts. Alternatively, in other embodiments, the target merchant identifier associated with the top ranked target merchant data object may be stored associated with an identified sales user account identifier associated with the most experience in managing merchant data objects (for example, based on an experience indicator included in or associated with the sales user account data structure).

A user associated with a sales user account data structure may manage merchant data objects stored, or otherwise assigned, associated with the corresponding sales user account data structure. In some embodiments, user may access one or more tools for generating deal offers for transmission to one or more users associated with the merchant data object (for example, by transmitting the deal offer via email). Alternatively or additionally, in some embodiments, the user may have one or more offline responsibilities associated with managing assigned merchant data objects.

Example Process for Configuring a Device Based on Ranked Models

FIG. 7 illustrates an example process for ranking two or more models and configuring at least one device based on a top ranked model, in accordance with example embodiments of the present disclosure. For example, at least one device may be configured to utilize the top ranked model for predictions (e.g., to predict future electronic currency values for merchant data objects). In some embodiments, the process may be executed by a merchant-market management system, for example a merchant-market management system embodied by an apparatus, such as the apparatus 200.

At block 702, the apparatus 200 includes means, such as prediction management module 212, database management module 216, communications module 208, processor 202, and/or the like, or a combination thereof, for identifying a counterfactual incremental electronic currency impact set, the counterfactual incremental electronic currency impact set associated with a target merchant identifier set. In some embodiments, the apparatus 200 determines the target merchant identifier set automatically. In some embodiments, the apparatus 200 is configured to generate the counterfactual incremental electronic currency impact set for at least one target merchant identifier. The apparatus 200 may generate the counterfactual incremental electronic currency impact using the process described above with respect to FIG. 3.

In other embodiments, to identify the counterfactual incremental electronic currency impact set, the counterfactual incremental electronic currency impact set may be retrieved from one or more databases. For example, in some embodiments the apparatus 200 stores each generated counterfactual incremental electronic currency impact. The apparatus may retrieve the stored generated counterfactual incremental electronic currency impacts by querying the database based on the target merchant identifier set.

At block 704, the apparatus 200 includes means, such as prediction management module 212, database management module 216, communications module 208, processor 202, and/or the like, or a combination thereof, for generating a counterfactual target merchant data object ranking list based on the counterfactual incremental electronic currency impact set. The counterfactual target merchant data object ranking list includes at least one target merchant data object ranking. In some embodiments, the counterfactual target merchant data object ranking list includes a merchant data object ranking for each target merchant data object associated with a target merchant identifier in the target merchant identifier set.

In some embodiments, the counterfactual target merchant data object ranking list is generated by comparing the various counterfactual incremental electronic currency impacts in the counterfactual incremental electronic currency impact set for each target merchant identifier. For example, the counterfactual target merchant data object ranking list may include a top target merchant data object ranking associated with the target merchant identifier that is associated with the greatest value counterfactual incremental electronic currency impact. The counterfactual target merchant data object ranking list may further include target merchant identifier rankings for each subsequent target merchant identifiers in order of descending counterfactual incremental electronic currency impacts. It should be appreciated that, in other embodiments, other algorithms and/or formulas may be utilized for ranking. For example, in some embodiments the top target merchant identifier may be associated with a high numerical value in some embodiments and in other embodiments the top target merchant identifier may be associated with a low numerical value.

At block 706, the apparatus 200 includes means, such as prediction management module 212, database management module 216, communications module 208, processor 202, and/or the like, or a combination thereof, for identifying a first predictive incremental electronic currency impact set generated by an incrementality-trained ensemble model, the first predictive incremental electronic currency impact set associated with the target merchant identifier set. In some embodiments, the apparatus 200 may generate at least one predictive incremental electronic currency impact in the first predictive incremental electronic currency impact set, for example using the process described above with respect to FIG. 4. In some embodiments, the apparatus 200 generates all the predictive incremental electronic currency impacts in the first predictive incremental electronic currency impact set using an incrementality-trained ensemble model.

In other embodiments, to identify the first predictive incremental electronic currency impact set, the first predictive incremental electronic currency impact set may be retrieved from one or more databases or repositories. For example, in some embodiments the apparatus 200 stores each generated predictive incremental electronic currency impact for each target merchant identifier. The apparatus may retrieve the stored, generated predictive incremental electronic currency impact set by querying the database based on the target merchant identifier set. In some such embodiments, the generated predictive incremental electronic currency impact set may be received as response data to the query.

At block 708, the apparatus 200 includes means, such as prediction management module 212, database management module 216, communications module 208, processor 202, and/or the like, or a combination thereof, for generating a first target merchant data object ranking list based on the first predictive incremental electronic currency impact set. The first target merchant data object ranking list includes at least one target merchant data object ranking. In some embodiments, the first target merchant data object ranking list includes a merchant data object ranking for each target merchant data object associated with a target merchant identifier in the target merchant identifier set.

In some embodiments, the first target merchant data object ranking list is generated by comparing the various predictive incremental electronic currency impacts in the first predictive incremental electronic currency impact set for each target merchant identifier. For example, the first predictive target merchant data object ranking list may include a top target merchant data object ranking associated with the target merchant identifier that is associated with the greatest value predictive incremental electronic currency impact generated by the incrementality-trained ensemble model. The first predictive target merchant data object ranking list may further include target merchant identifier rankings for each subsequent target merchant identifiers in order of descending predictive incremental electronic currency impacts generated by the incrementality-trained ensemble model. It should be appreciated that, in other embodiments, other algorithms and/or formulas may be utilized for ranking. For example, in some embodiments the top target merchant identifier may be associated with a high numerical value in some embodiments and in other embodiments the top target merchant identifier may be associated with a low numerical value.

At block 710, the apparatus 200 includes means, such as prediction management module 212, database management module 216, communications module 208, processor 202, and/or the like, or a combination thereof, for identifying at least one additional predictive incremental electronic currency impact set, each additional predictive incremental electronic currency impact set generated by another model and each predictive incremental electronic currency impact set associated with the target merchant identifier set. In some embodiments, at least one additional predictive incremental electronic currency impact set is identified for each other additional model associated with the apparatus 200. For example, in some embodiments, the apparatus 200 may be configured to maintain, or be associated with, a set of additional models for predicting a predictive incremental electronic currency impact for a target merchant data object, and an additional predictive incremental electronic currency impact set may be generated for each using the corresponding additional model.

Each additional model may be configured to generate a predictive incremental electronic currency impact associated with a target merchant data object having a target merchant identifier in the target merchant identifier set. In some embodiments, the apparatus 200 may generate one or more of the at least one additional predictive incremental electronic currency impact set using a corresponding additional model.

In other embodiments, to identify at least one of the additional predictive incremental electronic currency impact set, the additional predictive incremental electronic currency impact set may be retrieved from one or more databases or repositories. Each additional predictive incremental electronic currency impact set may be stored associated with the additional model used to generate the additional predictive incremental electronic currency impact set. The apparatus 200 may retrieve the stored, generated additional predictive incremental electronic currency impact set by querying the database or repository based on the target merchant identifier set and/or an identifier associated with the additional model. In some such embodiments, each additional predictive incremental electronic currency impact set may be received as response data to the query.

At block 712, the apparatus 200 includes means, such as prediction management module 212, database management module 216, communications module 208, processor 202, and/or the like, or a combination thereof, for generating, for each additional predictive incremental electronic currency impact set, an additional target merchant data object ranking list. Each additional target merchant data object ranking list includes at least one target merchant data object ranking. In some embodiments, each additional target merchant data object ranking list includes a merchant data object ranking for each target merchant data object associated with a target merchant identifier in the target merchant identifier set.

In some embodiments, each additional target merchant data object ranking list is generated by comparing the various predictive incremental electronic currency impacts associated with the target merchant identifier set in a corresponding additional predictive incremental electronic currency impact set. For example, each additional target merchant data object ranking list may include a top target merchant data object ranking associated with the target merchant identifier that is associated with the greatest value predictive incremental electronic currency impact generated by the additional model. It should be appreciated that, in other embodiments, other algorithms and/or formulas may be utilized for ranking. For example, in some embodiments, the top target merchant identifier may be associated with a high numerical value and in other embodiments the top target merchant identifier may be associated with a low numerical value.

At block 714, the apparatus 200 includes means, such as prediction management module 212, database management module 216, communications module 208, processor 202, and/or the like, or a combination thereof, for generating a first value rank correlation score based on the counterfactual target merchant data object rankling list and the first predictive target merchant data object ranking list. In some embodiments, the first value rank correlation score is based on a comparison between the counterfactual target merchant data object ranking list and the first predictive target merchant data object ranking list. The first value rank correlation score may, for example, be based on the ratio of target merchant data object rankings matching between the two ranking lists. In some embodiments, the first value rank correlation score comprises a Spearman rank correlation.

At block 716, the apparatus 200 includes means, such as prediction management module 212, database management module 216, communications module 208, processor 202, and/or the like, or a combination thereof, for generating, for each additional predictive incremental electronic currency impact set, an additional value rank correlation score based on the counterfactual target merchant data object ranking list and each additional target merchant data object ranking list. In some embodiments, an additional value rank correlation score associated with a corresponding additional target merchant data object ranking list is based on comparison between the additional target merchant data object ranking list and the counterfactual target merchant data object ranking list. The additional value rank correlation score may, for example, be based on the ratio of the target merchant data object rankings matching between the two ranking lists. In some embodiments, some or all of the additional value rank correlation scores may comprise a Spearman rank correlation. It should be appreciated that, because each additional model may generate different predictive incremental electronic currency impacts for the target merchant data objects, each additional value rank correlation score may be different.

At block 718, the apparatus 200 includes means, such as prediction management module 212, database management module 216, communications module 208, processor 202, and/or the like, or a combination thereof, for generating a model ranking list based on the first value rank correlation score and the at least one additional value rank correlation score, the model ranking list comprising a top ranked model. The top ranked model may be associated with the additional model whose generated merchant data object ranking list most closely matched the counterfactual merchant data object ranking list. The model ranking list may rank the various remaining models based on the value rank correlation score for each model. For example, the models may be ranked from best value rank correlation score (e.g., most similarities to the counterfactual merchant data object ranking list) to the worst value rank correlation score (e.g., least similarities to the counterfactual merchant data object ranking list). In other embodiments, the model ranking list includes only the top ranked model.

At optional block 720, the apparatus 200 includes means, such as model utilization module 214, communications module 208, processor 202, and/or the like, or a combination thereof, for configuring at least one device based on the top ranked model. The at least one device may be configured to utilize the top ranked model for generating future electronic currency values or predictive electronic currency values for one or more target merchants. In some embodiments, a control signal may be transmitted to one or more devices to cause the device to access, install, or otherwise provision itself for accessing the top ranked model. For example, the apparatus 200 may cause a device to access program code for executing the top ranked model. In some embodiments, the apparatus 200 configures itself to utilize the top ranked model. For example the apparatus 200 may set a model use indicator that represents the particular model to use to rank target merchant data objects that may be added.

In some embodiments, models are ranked at a predefined update interval. For example, various models may be re-ranked every month, quarter, year, or the like. In some embodiments, the apparatus 200 is configured to track a time interval associated with a previous update timestamp. Once the time interval exceeds the predefined update interval, the apparatus may generate an updated model ranking list and configure at least one device based on the top ranked model upon completion of generating the updated model ranking list.

CONCLUSION

In some embodiments, some of the operations with respect to the above flowcharts and data flow diagrams may be modified or further amplified. Furthermore, in some embodiments, additional optional operations may be included. The above depicted operations, as well as any modifications, amplifications, and/or additions to the operations above may be performed in any order and in any combination. For example, in some embodiments, several or all of the operations illustrated in the flowcharts are performed in an arrangement different than the particular arrangement depicted and described above.

Having the benefit of the teachings presented in the foregoing descriptions and the associated drawings, many modifications and other embodiments of the present disclosure will come to mind to one skilled in the art to which this disclosure pertains. Therefore, it is to be understood that this disclosure is not limited to the specific embodiments disclosed herein, and that modifications and other embodiments are intended to be included within the scope of the appended claims. Although specific terms are employed herein, they are used in a generic and descriptive sense only and not for purposes of limitation.

It should be appreciated that, in some embodiments, the flowcharts and/or data flows illustrated and described in the aforementioned figures may embody a particular process or method including the various operational blocks. Additionally or alternatively, the process or method may be implemented using the described modules, components, and the like, such that the various operational blocks form a particular computer-implemented method. In other embodiments, the operational blocks may be embodied by computer-coded instructions configured to be executed by an apparatus, or a system. In this regard, the computer-coded instructions may be stored in one or more memory devices for execution by one or more processors, or processing circuitry or modules, to cause the apparatus to perform the operational steps. In yet other embodiments, the operational blocks may be embodied by computer program code stored on a non-transitory computer readable storage medium, which may be included in a computer program product. The computer program code may be configured such that the computer program code is executable in conjunction with a processor to cause the processor, for example a processor of an apparatus or system external to the computer program product, to perform the operations depicted by the operational blocks of the flowcharts and data flow diagrams.

What is claimed is:

1. An apparatus comprising at least one processor and at least one memory, the at least one memory including computer-coded instructions therein, wherein the computer-coded instructions are configured to, in execution with the at least one processor, configure the apparatus to:
   receive a merchant market identifier associated with a total merchant data object set;
   receive a target merchant identifier associated with a target merchant data object,
   wherein the total merchant data object set is associated with the target merchant data object and a remaining merchant data object set;
   determine a counterfactual input feature set associated with the remaining merchant data object set;
   identify a counterfactual training market record set, the counterfactual training market record set associated with the counterfactual input feature set and a first electronic currency value set;
   train a counterfactual model based on the counterfactual training market record set;
   generate, based on the counterfactual input feature set and using the counterfactual model, a counterfactual electronic currency value associated with the remaining merchant data object set;
   identify an actual electronic currency value associated with the total merchant data object set;
   determine a counterfactual incremental electronic currency impact associated with the target merchant data object based on the actual electronic currency value and the counterfactual electronic currency value; and
   train the counterfactual model based at least in part on the counterfactual electronic currency value or the counterfactual incremental electronic currency impact.

2. The apparatus of claim 1, wherein the counterfactual incremental electronic currency impact is associated with a first timestamp interval, and the apparatus further configured to:
   calculate an adjusted counterfactual incremental electronic currency impact based on the counterfactual electronic currency value, wherein the adjusted counterfactual incremental electronic currency impact is associated with a second timestamp interval.

3. The apparatus of claim 1, wherein to determine the counterfactual input feature set, the apparatus is configured to:
   identify a first observed market record set associated with the merchant market identifier; and
   identify a second observed market record set associated with the target merchant data object,
   wherein the counterfactual input feature set is determined based on the first observed market record set and the second observed market record set.

4. The apparatus of claim 1, wherein the counterfactual model comprises a linear mixture model.

5. The apparatus of claim 2, the apparatus further configured to:
   receive a predictive input set comprising at least the merchant market identifier;
   generate, using a predictive model, a predictive electronic currency value associated with the merchant market identifier;
   identify a dependent score set associated with the merchant market identifier; and
   generate, using the incrementality-trained ensemble model, the predictive incremental electronic currency impact associated with the target merchant identifier based on the predictive electronic currency value and the dependent score set.

6. The apparatus of claim 5, the apparatus further configured to:
   identify a predictive training market record set, the predictive training market record set associated with at least a predictive training feature set and a second electronic currency value set,
   wherein the electronic currency value set comprises at least the adjusted counterfactual incremental electronic currency impact, and
   train the predictive model based at least in part on the predictive training market record set.

7. The apparatus of claim 6, the apparatus further configured to:
   identify a record time horizon threshold; and
   for at least one primary merchant market identifier:
      query for a primary market record set based on the primary merchant market identifier; and determine whether the primary market record set satisfies the record time horizon threshold,
wherein, in a circumstance where the primary market record set satisfies the record time horizon threshold, the counterfactual market record set or the predictive market record set comprises at least the primary market record set associated with the primary merchant market identifier, and
wherein, in a circumstance where the primary market record set does not satisfy the record time horizon threshold, the computer program instructions are further configured to:
identify a shared merchant market identifier associated with the primary merchant market identifier; and
retrieve a shared market record set associated with the shared merchant market identifier,
wherein the counterfactual market record set or the predictive market record set comprise at least the shared market record set associated with the shared merchant market identifier.

8. The apparatus of claim 1, the apparatus further configured to:
identify an ensemble training record set, the ensemble training record set associated with an ensemble training feature set; and
train the incrementality-trained ensemble model based on the ensemble training record set.

9. The apparatus of claim 5, wherein the predictive incremental electronic currency impact comprises a first predictive incremental electronic currency impact, and the apparatus further configured to:
generate a second predictive incremental electronic currency impact associated with a second target merchant identifier and the merchant market identifier;
generate a target merchant data object ranking list based on the first predictive incremental electronic currency impact and the second predictive incremental electronic currency impact,
wherein the target merchant data object ranking list comprises at least a top ranked target merchant identifier;
identify a sales user account identifier associated with a sales user account data structure; and
store the top ranked target merchant identifier associated with the identified sales user account identifier.

10. The apparatus of claim 5, wherein the predictive incremental electronic currency impact comprises a first predictive incremental electronic currency impact, wherein a first model comprises a combination of the predictive model and the incrementality-trained ensemble model, and the apparatus further configured to:
generate a first value rank correlation score based on at least the counterfactual incremental electronic currency impact and predictive incremental electronic currency impact, the first value rank correlation score associated with the first model;
identify at least one additional value rank correlation score associated with at least one other model;
generate a model ranking list based on the first value rank correlation score and the at least one additional value rank correlation score,
wherein the model ranking list comprises a top ranked model; and
configure at least one device based on the top ranked model.

11. A computer-implemented method comprising:
receiving a merchant market identifier associated with a total merchant data object set;
receiving a target merchant identifier associated with a target merchant data object,
wherein the total merchant data object set is associated with the target merchant data object and a remaining merchant data object set;
determining a counterfactual input feature set associated with the remaining merchant data object set;
identifying a counterfactual training market record set, the counterfactual training market record set associated with the counterfactual input feature set and a first electronic currency value set;
training the counterfactual model based on the counterfactual training market record set;
generating, based on the counterfactual input feature set and using a counterfactual model, a counterfactual electronic currency value associated with the remaining merchant data object set;
identifying an actual electronic currency value associated with the total merchant data object set;
determining a counterfactual incremental electronic currency impact associated with the target merchant data object based on the actual electronic currency value and the counterfactual electronic currency value; and
training the counterfactual model based at least in part on the counterfactual electronic currency value or the counterfactual incremental electronic currency impact.

12. The apparatus of claim 1, the apparatus further configured to:
allocate a portion of resources associated with the target merchant identifier based at least in part on the counterfactual incremental electronic currency impact and a predictive incremental electronic currency impact associated with the target merchant identifier, the predictive incremental electronic currency impact generated utilizing an incrementality-trained ensemble model.

13. The method of claim 11, wherein the counterfactual incremental electronic currency impact is associated with a first timestamp interval, and the method further comprising:
calculating an adjusted counterfactual incremental electronic currency impact based on the counterfactual electronic currency value, wherein the adjusted counterfactual incremental electronic currency impact is associated with a second timestamp interval.

14. The method of claim 11, determining the counterfactual input feature set comprises:
identifying a first observed market record set associated with the merchant market identifier; and
identifying a second observed market record set associated with the target merchant data object,
wherein the counterfactual input feature set is determined based on the first observed market record set and the second observed market record set.

15. The method of claim 13, further comprising
receiving a predictive input set comprising at least the merchant market identifier;
generating, using a predictive model, a predictive electronic currency value associated with the merchant market identifier;
identifying a dependent score set associated with the merchant market identifier; and
generating, using the incrementality-trained ensemble model, the predictive incremental electronic currency impact associated with the target merchant identifier based on the predictive electronic currency value and the dependent score set.

16. The method of claim 15, further comprising:
identifying a predictive training market record set, the predictive training market record set associated with at least a predictive training feature set and a second electronic currency value set,
wherein the electronic currency value set comprises at least the adjusted counterfactual incremental electronic currency impact.

17. The method of claim 16, further comprising:
identifying a record time horizon threshold; and
for at least one primary merchant market identifier:
querying for a primary market record set based on the primary merchant market identifier; and
determining whether the primary market record set satisfies the record time horizon threshold,
wherein, in a circumstance where the primary market record set satisfies the record time horizon threshold, the counterfactual market record set or the predictive market record set comprises at least the primary market record set associated with the primary merchant market identifier, and
wherein, in a circumstance where the primary market record set does not satisfy the record time horizon threshold:
identifying a shared merchant market identifier associated with the primary merchant market identifier; and
retrieving a shared market record set associated with the shared merchant market identifier,
wherein the counterfactual market record set or the predictive market record set comprise at least the shared market record set associated with the shared market merchant identifier.

18. The method of claim 15, wherein the predictive incremental electronic currency impact comprises a first predictive incremental electronic currency impact, wherein a first model comprises a combination of the predictive model and the incrementality-trained ensemble model, and wherein computer program instructions are further configured to:
generating a first value rank correlation score based on at least the counterfactual incremental electronic currency impact and predictive incremental electronic currency impact, the first value rank correlation score associated with the first model;
identifying at least one additional value rank correlation score associated with at least one other model;
generating a model ranking list based on the first value rank correlation score and the at least one additional value rank correlation score,
wherein the model ranking list comprises a top ranked model; and
configuring at least one device based on the top ranked model.

19. The method of claim 11, the method further comprising:
allocating a portion of resources associated with the target merchant identifier based at least in part on the counterfactual incremental electronic currency impact and a predictive incremental electronic currency impact associated with the target merchant identifier, the predictive incremental electronic currency impact generated utilizing an incrementality-trained ensemble model.

20. A computer program product comprising at least one non-transitory computer-readable storage medium having computer-executable program code instructions stored therein, the computer-executable program code instructions configured, in execution with a processor, to:
receive a merchant market identifier associated with a total merchant data object set;
receive a target merchant identifier associated with a target merchant data object,
wherein the total merchant data object set is associated with the target merchant data object and a remaining merchant data object set;
determine a counterfactual input feature set associated with the remaining merchant data object set;
identifying a counterfactual training market record set, the counterfactual training market record set associated with the counterfactual input feature set and a first electronic currency value set;
training the counterfactual model based on the counterfactual training market record set;
generate, based on the counterfactual input feature set and using a counterfactual model, a counterfactual electronic currency value associated with the remaining merchant data object set;
identify an actual electronic currency value associated with the total merchant data object set;
determine a counterfactual incremental electronic currency impact associated with the target merchant data object based on the actual electronic currency value and the counterfactual electronic currency value; and
train the counterfactual model based at least in part on the counterfactual electronic currency value or the counterfactual incremental electronic currency impact.

* * * * *

UNITED STATES PATENT AND TRADEMARK OFFICE
CERTIFICATE OF CORRECTION

| | | |
|---|---|---|
| PATENT NO. | : 12,118,496 B1 | Page 1 of 1 |
| APPLICATION NO. | : 17/014766 | |
| DATED | : October 15, 2024 | |
| INVENTOR(S) | : Situo Liu et al. | |

It is certified that error appears in the above-identified patent and that said Letters Patent is hereby corrected as shown below:

On the Title Page

Item (72), Inventors, Line 1, delete "Al" and insert -- Ali --, therefor.

Signed and Sealed this
Fourteenth Day of January, 2025

Derrick Brent
*Acting Director of the United States Patent and Trademark Office*